United States Patent
Renkis

(10) Patent No.: US 12,481,858 B1
(45) Date of Patent: Nov. 25, 2025

(54) ASSET MANAGEMENT WITH TAGS USING LOCATION AND ENVIRONMENTAL INTELLIGENCE

(71) Applicant: Tagii, Inc., Nashville, TN (US)

(72) Inventor: Martin A. Renkis, Nashville, TN (US)

(73) Assignee: ALPHATAG CORPORATION, Nashville, TN (US)

( * ) Notice: Subject to any disclaimer, the term of this patent is extended or adjusted under 35 U.S.C. 154(b) by 210 days.

(21) Appl. No.: 18/215,336

(22) Filed: Jun. 28, 2023

Related U.S. Application Data

(60) Provisional application No. 63/356,744, filed on Jun. 29, 2022.

(51) Int. Cl.
*G16Y 40/35* (2020.01)
*G06K 19/077* (2006.01)

(52) U.S. Cl.
CPC ........ *G06K 19/07758* (2013.01); *G16Y 40/35* (2020.01)

(58) Field of Classification Search
CPC .......................... G06K 19/07758; G16Y 40/35
See application file for complete search history.

(56) References Cited

U.S. PATENT DOCUMENTS

| | | | |
|---|---|---|---|
| 6,614,392 B2 | 9/2003 | Howard | |
| 7,012,520 B2 * | 3/2006 | Webb, Sr. | G06Q 10/08 340/568.1 |
| 7,142,121 B2 | 11/2006 | Chan et al. | |
| 7,265,668 B1 * | 9/2007 | Brosius | G06Q 10/08 340/539.22 |
| 7,336,182 B1 * | 2/2008 | Baranowski | G08B 13/1436 340/568.1 |
| 7,652,576 B1 * | 1/2010 | Crossno | G08B 21/0269 340/568.1 |
| 8,026,814 B1 * | 9/2011 | Heinze | G08B 13/1427 340/572.1 |
| 8,284,045 B2 | 10/2012 | Twitchell, Jr. | |
| 8,314,704 B2 | 11/2012 | Cova et al. | |
| 8,334,773 B2 | 12/2012 | Cova et al. | |
| 8,352,216 B2 * | 1/2013 | Subbu | G06F 11/30 700/109 |
| 8,514,082 B2 | 8/2013 | Cova et al. | |
| 8,593,276 B2 * | 11/2013 | Doyle | G08B 21/0236 340/539.11 |
| 8,600,405 B2 * | 12/2013 | Madsen | H04W 12/08 455/410 |

(Continued)

FOREIGN PATENT DOCUMENTS

| | | | | |
|---|---|---|---|---|
| CA | 3072056 A1 * | 2/2019 | ............ | G06Q 20/203 |
| KR | 20220129185 A * | 9/2022 | ............. | G16H 10/60 |
| WO | WO-2023113421 A1 * | 6/2023 | ............. | B64U 20/87 |

*Primary Examiner* — Chico A Foxx
(74) *Attorney, Agent, or Firm* — NEO IP

(57) ABSTRACT

Systems, apparatuses, and methods for asset tagging and management. Users connect any asset to the platform by scanning a tag affixed to the asset. Tagged assets are registered to a user's account. The platform deploys Artificial Intelligence (AI), Machine Learning (ML), and Deep Learning (DL) in order to promote efficient and effective management of a user's tagged assets, in addition to providing organizational, repair, and maintenance services for any tagged assets. The system incorporates location data and/or environmental data to manage the tagged assets.

16 Claims, 9 Drawing Sheets

(56) References Cited

U.S. PATENT DOCUMENTS

| | | | |
|---|---|---|---|
| 9,626,609 B1* | 4/2017 | Ferguson | H04W 76/10 |
| 9,916,328 B1* | 3/2018 | Sharifi | G06F 16/24578 |
| 10,121,028 B2 | 11/2018 | Sengstaken, Jr. | |
| 10,154,379 B2 | 12/2018 | Mei et al. | |
| 10,198,709 B2* | 2/2019 | Brignone | G06Q 10/087 |
| 10,303,905 B2 | 5/2019 | Lombardi et al. | |
| 10,360,778 B1* | 7/2019 | Lu | G06K 19/0723 |
| 10,430,755 B2 | 10/2019 | Aji | |
| 10,572,700 B2 | 2/2020 | Sengstaken, Jr. | |
| 10,896,360 B2 | 1/2021 | Tisdel | |
| 10,911,899 B2 | 2/2021 | Shen et al. | |
| 11,089,546 B2 | 8/2021 | Ayoub | |
| 11,195,184 B1* | 12/2021 | Dixon | G01S 19/13 |
| 11,388,546 B2* | 7/2022 | Williams | H04W 4/029 |
| 11,595,932 B1* | 2/2023 | Anand | H04W 4/40 |
| 11,750,448 B2* | 9/2023 | Singla | H04W 4/38 |
| | | | 709/222 |
| 11,886,845 B1* | 1/2024 | Barbato | G06F 8/38 |
| 11,906,960 B1* | 2/2024 | Gonzalez | G05B 23/0283 |
| 12,048,292 B2* | 7/2024 | Blanc | G01S 13/878 |
| 12,096,308 B2* | 9/2024 | Williams | G06F 21/6245 |
| 2002/0024443 A1* | 2/2002 | Hawkins | G08B 25/10 |
| | | | 340/572.1 |
| 2006/0208881 A1* | 9/2006 | Suzuki | G06Q 10/08 |
| | | | 340/539.27 |
| 2006/0250249 A1* | 11/2006 | Cheng | G06Q 10/08 |
| | | | 340/572.4 |
| 2006/0253590 A1* | 11/2006 | Nagy | H04L 67/52 |
| | | | 709/226 |
| 2006/0261948 A1* | 11/2006 | Czyszczewski | G06Q 10/087 |
| | | | 340/572.1 |
| 2007/0241905 A1* | 10/2007 | Himberger | G06K 19/0723 |
| | | | 340/572.1 |
| 2008/0198001 A1* | 8/2008 | Sarma | G01S 1/68 |
| | | | 340/8.1 |
| 2009/0072977 A1* | 3/2009 | Johnson | G06Q 40/00 |
| | | | 340/572.4 |
| 2010/0027894 A1* | 2/2010 | Dahari | G06T 7/0008 |
| | | | 382/218 |
| 2010/0156606 A1* | 6/2010 | Gold | H04Q 9/00 |
| | | | 340/10.4 |
| 2011/0011933 A1* | 1/2011 | McIntyre | G06Q 10/063 |
| | | | 235/385 |
| 2011/0037587 A1* | 2/2011 | Fan | G16H 40/20 |
| | | | 340/539.1 |
| 2011/0043324 A1* | 2/2011 | Fan | G06F 21/88 |
| | | | 340/5.1 |
| 2012/0144117 A1* | 6/2012 | Weare | G06F 12/0888 |
| | | | 711/119 |
| 2013/0183924 A1* | 7/2013 | Saigh | A61K 9/08 |
| | | | 455/404.2 |
| 2013/0214938 A1* | 8/2013 | Kim | G06Q 30/00 |
| | | | 340/870.07 |
| 2014/0131434 A1* | 5/2014 | Ozkan | H04W 4/02 |
| | | | 235/375 |
| 2016/0050530 A1* | 2/2016 | Corbalis | G06Q 20/3278 |
| | | | 455/456.1 |
| 2016/0110984 A1* | 4/2016 | Seol | G08B 21/02 |
| | | | 340/539.13 |
| 2016/0239802 A1* | 8/2016 | Burch, V | H04W 4/12 |
| 2016/0371630 A1 | 12/2016 | Jetcheva et al. | |
| 2017/0083857 A1 | 3/2017 | Barton et al. | |
| 2017/0223121 A1* | 8/2017 | Fisher | H04L 67/52 |
| 2018/0204256 A1* | 7/2018 | Bifolco | G06Q 30/0625 |
| 2018/0205546 A1* | 7/2018 | Haque | H04L 9/3213 |
| 2018/0247137 A1* | 8/2018 | Boyle | G06F 16/9537 |
| 2018/0321356 A1* | 11/2018 | Kulkarni | H04W 64/003 |
| 2019/0080277 A1* | 3/2019 | Trivelpiece | G06N 20/00 |
| 2019/0102735 A1 | 4/2019 | Barton et al. | |
| 2019/0149354 A1* | 5/2019 | Madhani | H04L 12/2825 |
| | | | 702/182 |
| 2019/0172012 A1* | 6/2019 | Roy | G06Q 10/0875 |
| 2019/0362306 A1 | 11/2019 | Sharma et al. | |
| 2020/0025401 A1* | 1/2020 | Cheon | G05B 15/02 |
| 2020/0096602 A1* | 3/2020 | Hergesheimer | G01S 5/0294 |
| 2020/0233577 A1* | 7/2020 | Bagarolo | G06F 3/0482 |
| 2020/0258182 A1* | 8/2020 | Bentley | G06F 16/2379 |
| 2020/0265331 A1* | 8/2020 | Tashman | G06N 20/20 |
| 2020/0272657 A1* | 8/2020 | Gardner | G06F 18/2321 |
| 2020/0364525 A1* | 11/2020 | Mats | G06K 19/0717 |
| 2020/0372315 A1* | 11/2020 | Jablonski | G01S 11/04 |
| 2021/0012393 A1* | 1/2021 | Davis | G01D 21/02 |
| 2021/0019693 A1* | 1/2021 | Gu | G06Q 10/087 |
| 2021/0133696 A1 | 5/2021 | Volkerink et al. | |
| 2021/0335488 A1* | 10/2021 | Higginson | H04B 17/318 |
| 2021/0366251 A1* | 11/2021 | Volkerink | G06Q 10/087 |
| 2022/0003588 A1* | 1/2022 | Volkerink | H04Q 9/00 |
| 2022/0004163 A1* | 1/2022 | Amihai | G05B 23/024 |
| 2022/0014878 A1* | 1/2022 | Lee | H04W 76/14 |
| 2022/0187817 A1* | 6/2022 | Fenstermacher | G06N 7/01 |
| 2022/0200519 A1* | 6/2022 | Biffert | A01K 11/006 |
| 2022/0309079 A1* | 9/2022 | Kurniawan | H04L 12/12 |
| 2023/0127525 A1* | 4/2023 | Rai | G06V 10/74 |
| | | | 706/21 |
| 2023/0229985 A1* | 7/2023 | Fastner | G06F 3/0482 |
| | | | 705/7.14 |
| 2023/0316220 A1* | 10/2023 | Bifolco | G06Q 30/0635 |
| | | | 705/28 |
| 2024/0193693 A1* | 6/2024 | Kutty | G06Q 40/06 |
| 2025/0131186 A1* | 4/2025 | Perumal | G06V 20/52 |

* cited by examiner

ASSET MANAGEMENT WITH TAGS USING LOCATION AND ENVIRONMENTAL INTELLIGENCE

CROSS REFERENCES TO RELATED APPLICATIONS

This application is related to and claims priority from the following U.S. patent application. This application claims priority to and the benefit of U.S. Application No. 63/356,744, filed Jun. 29, 2022, which is incorporated herein by reference in its entirety.

BACKGROUND OF THE INVENTION

1. Field of the Invention

The present invention relates to an asset management and artificial intelligence system for non-network enabled assets, and more specifically to tagging, connecting, locating, and managing the assets of a user.

2. Description of the Prior Art

It is generally known in the prior art to provide trackable items that rely on BLUETOOTH or RFID technology to determine the location of assets the item may be attached to or incorporated into. Similarly, it is generally known in the prior art to provide remote environmental sensors operable to collect and transmit environmental data about the surrounding environment.

Prior art patent documents include the following:

US Patent Publication No. 2021/0133696 for Recycling assets incorporating wireless tags by inventors Volkerink, et al., filed Nov. 2, 2020 and published May 6, 2021, is directed to a wireless tracking system for tracking and monitoring assets. The wireless tracking system comprises wireless tags. A wireless tag is configured to track a respective asset during delivery to a shipping address. After the asset has arrived at the shipping address, the wireless tag is released to a delivery service to be delivered to the return address for recycling or renovating an electronic component of the wireless tag, e.g., by wired or wirelessly recharging the energy source. The wireless tracking system remotely monitors a performance level of the energy source via a wireless communication with the wireless tag and, responsive to the performance level of the energy source being below a threshold level, transmits a notification to a user of the wireless tracking system to ship the wireless tag to the return address for renovation or recycling.

US Patent Publication No. 2019/0362306 for Systems, methods, and devices for tracking a shipment using a wireless tracker by inventors Sharma, et al., filed Aug. 9, 2019 and published Nov. 28, 2019, is directed to systems, methods, and devices for tracking a shipment using a wireless tracker. The wireless tracker determines a location of the wireless tracker device and regulates battery usage of wireless tracker based on the location. In addition, the wireless tracker is configured to determine a current location of the wireless tracker device at one or more intervals such that the one or more intervals are based on a delivery route of the shipment. Moreover, the wireless tracker is configured to receive and verify one or more codes to for a chain of custody of the shipment. Also, the wireless tracker is configured to determine a trigger event based on the location of the wireless tracker device and/or sensor information as well as send a notification to a computer server based on the trigger event.

US Patent Publication No. 2019/0102735 for Systems and methods for tracking location and monitoring environmental conditions of an asset in transit by inventors Barton, et al., filed Dec. 3, 2018 and published Apr. 4, 2019, is directed to systems, methods and devices are provided for real-time tracking a location an asset (e.g., package) that is in transit (rail, air, truck, etc.) and real-time monitoring of environmental conditions that the asset is subjected to during transit such as temperature, light exposure, barometric pressure, and other conditions.

US Patent Publication No. 2017/0083857 for GPS shipping and temperature sensor label by inventors Barton, et al., filed Sep. 17, 2015 and published Mar. 23, 2017, is directed to a system for locating and tracking of packages. The system for tracking packages comprises an attached RFID/GPS label housing a GPS barcode which allows businesses to track packages utilizing longitude and latitude technology. In use, the barcode/shipping label is activated by a wafer like, flexible, printable battery label by entering the GPS barcode into a software program. The RFID is imbedded on the back of the label such that when the GPS barcode is activated the package can be tracked. Additionally, a smart app is provided for tracking and identifying the location of the package, providing an exact address of the package's location and to monitor the temperature of their goods and an alert will be sent to the shipper and consignee once the temperature breaches the desired set temperature. Customers with this new concept can now see their shipments move in real-time based on its final destination.

US Patent Publication No. 2016/0371630 for Personal inventory management for a quantified home by inventors Jetcheva, et al., filed Jun. 17, 2015 and published Dec. 22, 2016, is directed to a system that includes a quantified home, a mobile client device and an inventory analytics server. The quantified home includes an item set and one or more reader devices. The item set includes an item and a tag that is affixed to the item. The tag is configured to be monitored by the one or more reader devices. The mobile client device is configured to register the item with a personal inventory and receive description data describing a set of conditions associated with the item. The one or more reader devices are configured to monitor movement of the tag within the quantified home and generate history data describing the movement. The inventory analytics server is configured to receive the description data and history data. The inventory analytics server is configured to determine that a condition included in the set of conditions has been met and initiate a user specified action.

U.S. Pat. No. 8,514,082 for Asset monitoring and tracking system by inventors Cova, et al., filed Aug. 8, 2012 and issued Aug. 20, 2013, is directed to techniques for monitoring and tracking assets and providing notifications to users. In one aspect, a request to track an asset and enterprise data describing the asset are received, a tag is selected to associate with the asset, an event notification is received from the tag, and a user notification is generated from the event notification and the enterprise data. In another aspect, a request for a tag is received, a tag is selected in response to the request, a tag is routed to the origin location for the tag, a notification is received that the tag has arrived at a destination location, and the tag is routed from the destination location to a tag pool.

U.S. Pat. No. 8,334,773 for Asset monitoring and tracking system by inventors Cova, et al., filed Sep. 15, 2009 and issued Dec. 18, 2012, is directed to techniques for monitoring and tracking assets and providing notifications to users. In one aspect, a request to track an asset and enterprise data describing the asset are received, a tag is selected to associate with the asset, an event notification is received from the tag, and a user notification is generated from the event notification and the enterprise data. In another aspect, a request for a tag is received, a tag is selected in response to the request, a tag is routed to the origin location for the tag, a notification is received that the tag has arrived at a destination location, and the tag is routed from the destination location to a tag pool.

U.S. Pat. No. 8,314,704 for Asset tracking using alternative sources of position fix data by inventors Cova, et al., filed Sep. 25, 2009 and issued Nov. 20, 2012, is directed to techniques for tracking physical assets. In one aspect, input indicating that an asset has been loaded on a conveyance is received. When a tag attached to the asset is unable to transmit position fix data describing a location of the asset to a server, alternative position fix data (e.g., from the conveyance or another tag coupled to another asset on the conveyance) is used to indicate the position of the asset and tag. In another aspect, a relay component is used to receive the tag position fix data from the tag and forward it to the server.

U.S. Pat. No. 8,284,045 for Container tracking system by inventor Twitchell, filed May 22, 2009 and issued Oct. 9, 2012, is directed to shipping containers that are networked for transferring data between the shipping containers. The shipping containers include sensors for detecting conditions associated with the shipping containers. The conditions sensed by any shipping container whether transported by rail or ship is transmitted from an ad hoc network, via a gateway configured for satellite or cellular communications for example, to a container-tracking application server or equivalent computer system. The computer system is remotely located to the shipping container for central compilation, analysis, and/or display of data regarding the shipping containers.

U.S. Pat. No. 7,652,576 for Method and apparatus for locating and/or otherwise monitoring an ID tagged asset's condition by inventors Crossno, et al., filed Aug. 24, 2006 and issued Jan. 26, 2010, is directed to a method and apparatus for electronically and wirelessly monitoring a plurality of ID tags of assets as a service for a plurality of tagged asset users and notifying the tagged asset user and/or other authorized entities when conditions sensed by tag circuitry exceeds predetermined boundaries. Typically, the tag will include wireless GPS and/or other sensing circuitry along with telephone type circuitry for communicating sensed data, such as location, to the monitoring service. The notification may further include advertising or other information specifically helpful to the owner of the tagged asset.

U.S. Pat. No. 7,142,121 for Radio frequency device for tracking goods by inventors Chan, et al., filed Jun. 4, 2004 and issued Nov. 28, 2006, is directed to a radio frequency (RF) device (or "tag") for containing specific information relating to a particular good being shipped from one location (e.g., warehouse) to another (e.g., customer). The device includes a circuitized substrate (e.g., a printed circuit board), a semiconductor chip, an antenna and a power regulator, and is designed to be partly inserted within a good (e.g., a cardboard box) containing one or more of the goods being shipped and tracked. Alternatively, the device may be attached by other means (e.g., adhesive). A shipper can simply track the goods containing such devices using wireless communication devices (e.g., satellites) to quickly and readily ascertain the specific location of the goods at any time as well as the appropriate desired information relating to such goods (e.g., quantity, weight, type, etc.).

U.S. Pat. No. 6,614,392 for Combination RFID and GPS functionality on intelligent label by inventor Howard, filed Dec. 7, 2001 and issued Sep. 2, 2003, is directed to an intelligent label comprising a radio frequency transponder coupled to a global positioning system, both of which are attached to a substrate. Once the intelligent label is attached to an object, it will enable the object to be tracked as it moves from one point to another point. As the object moves, the global positioning system receives signals from GPS satellites and processes those signals into location data. The data is then either transmitted directly to an interrogation station by the radio frequency transponder, or stored in a memory. The memory serves to allow all or part of the previous location data to be stored for transmittal to an interrogator at a later date.

U.S. Pat. No. 11,089,546 for Inventory tracking tags, system and method for prolonging battery life by inventor Ayoub, filed Sep. 27, 2018 and issued Aug. 10, 2021, is directed to devices and methods for prolonging battery life of an inventory tracking tag. The tag determines its location and reports to remote server over a cellular data connection using the cellular communication subsystem. The remote server assesses whether the tag is within range of a short-range communication network, such as a WiFi network, and sends an instruction message over the cellular data connection to instruct the tag to use the first short-range communication network. The instruction message may include credentials for connecting to the network. The tag disables the cellular communication subsystem, enables the short-range communication subsystem, and requests a connection to the first short-range communication network for the purpose of sending future location reports to the remote server.

U.S. Pat. No. 10,911,899 for Providing indication to location of physical object using wireless tag by inventors Shen, et al., filed Nov. 7, 2018 and issued Feb. 2, 2021, is directed to a method that includes: sending, by a first processing device, a first message including an instruction to a first tag to collect first data from at least one device, the first tag coupled to a first physical object for organizing the first physical object; receiving, by the first processing device, a second message from the first tag, the second message including the first data; obtaining, by the first processing device, a first descriptor as being associated with the first data; and presenting, by the first processing device, at least the first descriptor to a user as an indication to a location of the first physical object.

U.S. Pat. No. 10,896,360 for Tracking systems, methods and apparatus by inventor Tisdel, filed Feb. 21, 2019 and issued Jan. 19, 2021, is directed to a tracking system. The system includes a wireless tracker having a machine-readable identification and an antenna configured to receive and transmit wireless signals; a fastener that includes a machine-readable identification; and a container capable of receiving and containing physical items. The fastener is capable of coupling with the wireless tracker and container to secure the wireless tracker to the container and secure the container in a closed configuration. Also disclosed are method of remotely monitoring items, and management software for tracking items using blockchain technology.

U.S. Pat. No. 10,572,700 for Wireless asset location tracking system and related techniques by inventor Sengstaken, filed Apr. 26, 2017 and issued Feb. 25, 2020, is directed to a wireless asset location tracking system and related techniques. The system may include one or more beacon tags and one or more micro-zone (mZone) transmitters disposed at designated locations. A given mZone transmitter may transmit an mZone signal including data pertaining to its identity, and thus location. A given beacon tag receiving the mZone signal may pull mZone identification data therefrom and relay it in its own beacon signal, along with other data. In this manner, a given mZone transmitter may provide information pertaining to the location within the host space of a given beacon tag within its transmission range. The beacon signal may be received by any gateway or reader device within range, and information therefrom may be delivered through the internet to a server database. The information stored at the server database may be accessed to monitor and track tagged assets and control overall system operation.

U.S. Pat. No. 10,430,755 for Inventory management device by inventor Aji, filed Dec. 6, 2016 and issued Oct. 1, 2019, is directed to an inventory management device to monitor a volume of a material in a container that may generally include a capacitive level sensor to measure a first capacitance value and a second capacitance value; a vibration sensor in electronic communication with the capacitive level sensor to generate a vibration signal that corresponds to a vibration of the container; a storage unit in electronic communication with the capacitive level sensor to store the first capacitance value; a controller in electronic communication with the capacitive level sensor and storage unit to measure a change in the capacitance between the first capacitance value and second capacitance value; a transmitter in electronic communication with the controller to transmit an output signal when the controller measures the change in capacitance; and a flexible battery to power the capacitive level sensor, vibration sensor, storage unit, controller, and transmitter.

U.S. Pat. No. 10,303,905 for Method and system for asset tracking in an enterprise environment by inventors Lombardi, et al., filed Jul. 14, 2017 and issued May 28, 2019, is directed to a method and system for tracking an asset in an indoor facility. The method includes receiving, from a first mobile device, an asset tracking tag collision report, the asset tracking tag collision report including a tag identifier of an asset tracking tag associated with an asset; determining a new location of the asset based on the received asset tracking tag collision report; updating an asset location database to indicate the new location of the asset; and, in response to determining the new location of the asset, transmitting an instruction message to a mobile device to cause the mobile device to direct the asset tracking tag to cease broadcasting the wireless signal. The method and system use crowdsourcing to determine a new location of an asset that has moved in an indoor facility.

U.S. Pat. No. 10,154,379 for Artificial intelligence for loss prevention tags by inventors Mei, et al., filed Nov. 13, 2017 and issued Dec. 11, 2018, is directed to methods, systems, and devices for preventing the loss of valuable items using beacon notifications. A loss prevention tag is a small, discreet electronic tag which can be attached to belongings in order to prevent them from being lost. The tag may communicate with a computer or mobile device (e.g., a smartphone or a smartwatch) and may transmit a notification when the object it is attached to moves beyond a threshold distance from the device it is communicating with. A loss prevention tag system may utilize a system of smart notifications. One function of the smart notification system is to remove false alarm notifications. Another function of the smart notification system may be to modify the mode or format of the notification.

U.S. Pat. No. 10,121,028 for Asset tag apparatus and related methods by inventor Sengstaken, filed Jun. 13, 2014 and issued Nov. 6, 2018, is directed to an asset tag apparatus and methods of monitoring assets with an asset tag. The asset tag apparatus includes a housing and a wireless transmitter located within the housing. A processor is located within the housing, wherein the processor is in communication with the wireless transmitter. An accelerometer is positioned within the housing, wherein the accelerometer is in communication with the processor, wherein a wake-up signal is transmitted from the accelerometer to the processor in response to an activation of the accelerometer, and wherein the wireless transmitter transmits a signal externally from the housing in response to the wake-up signal received by the processor.

SUMMARY OF THE INVENTION

The present invention relates to systems, apparatuses, and methods for management of non-network enabled assets, and more specifically to tagging, connecting, locating, and managing the assets of a user.

It is an object of this invention to provide management using of non-network enabled assets using machine learning and artificial intelligence and including environmental data and location data.

In one embodiment, the present invention provides a system for asset management comprising at least one tag attached to at least one asset, an asset management platform including a server with a processor and a memory, wherein the asset management platform includes an alert engine, wherein the at least one tag includes at least one sensor, wherein the at least one tag is associated with asset data related to the at least one asset, wherein the asset data is configured to be displayed on a display device upon the display device reading the at least one tag, wherein the at least one sensor is configured to collect data related to the at least one asset and transmit the data to the asset management platform, wherein the data includes environmental data, location data, image data, video data, and/or audio data, and wherein the alert engine of the asset management platform is configured to send an alert to a device in communication with the platform based on the data.

In another embodiment, the present invention provides a system for asset management comprising at least one tag associated with at least one asset, an asset management platform including a server with a processor and a memory, wherein the at least one tag includes at least one sensor, wherein the at least one tag is associated with asset data related to the at least one asset, wherein the asset data is configured to be displayed on a display device upon the display device reading the at least one tag, wherein the at least one sensor is configured to collect data related to the at least one asset and transmit the data to the asset management platform, wherein the data includes environmental data, location data, image data, video data, and/or audio data, and wherein the asset management platform is configured to send an instruction to an Internet of Things (IoT) device to change a parameter of the device, activate the device, or deactivate the device based on the data.

In yet another embodiment, the present invention provides a system for asset management comprising at least one first tag attached to at least one first asset, at least one second tag attached to at least one second asset, an asset management platform including a server with a processor and a memory, wherein the asset management platform includes an analysis engine and an alert engine, wherein the at least one first tag includes at least one first sensor, wherein the at least one second tag includes at least one second sensor, wherein the at least one first tag is associated with asset data related to the at least one first asset, wherein the at least one second tag is associated with asset data related to the at least one second asset, wherein the asset data related to the at least one first asset is configured to be displayed on a display device upon the display device reading the at least one first tag, wherein the asset data related to the at least one second asset is configured to be displayed on a display device upon the display device reading the at least one second tag, wherein the at least one first sensor is configured to collect data related to the at least one first asset and transmit the data related to the at least one first asset to the asset management platform, wherein the at least one second sensor is configured to collect data related to the at least one first second and transmit the data related to the at least one second asset to the asset management platform, wherein the data related to the first asset and the data related to the second asset includes environmental data, location data, image data, video data, and/or audio data, and wherein the analysis engine is configured to compare the data related to the first asset to a predetermined value for the first asset, wherein the analysis engine is configured to compare the data related to the second asset to a predetermined value for the second asset, and wherein the alert engine is configured to send an alert or an instruction to a device in communication with the platform upon the data related to the first asset meeting or exceeding the predetermined value for the first asset and the data related to the second asset meeting or exceeding the predetermined value for the second asset.

These and other aspects of the present invention will become apparent to those skilled in the art after a reading of the following description of the preferred embodiment when considered with the drawings, as they support the claimed invention.

DETAILED DESCRIPTION

Figure 1:
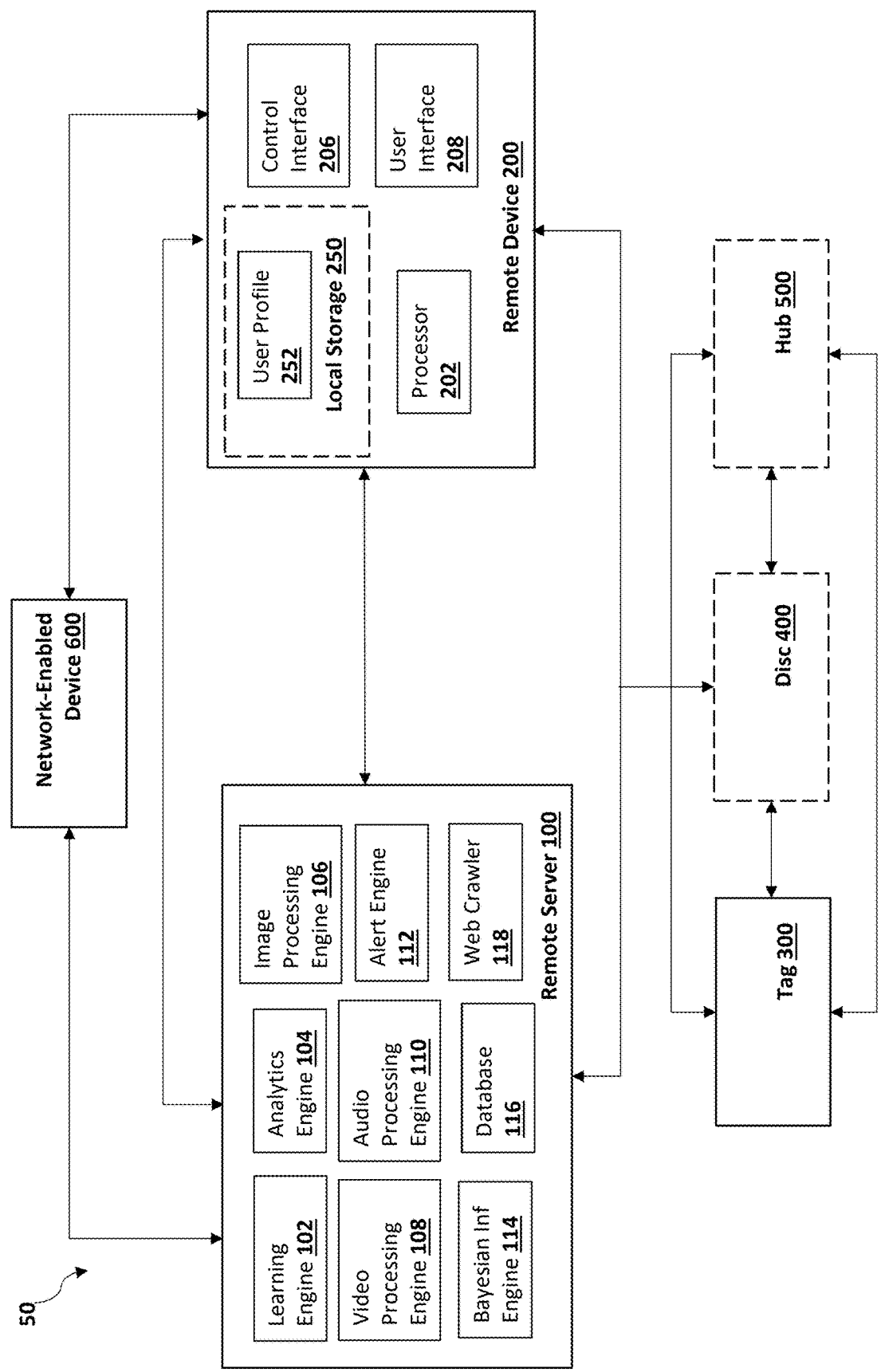
FIG. 1 illustrates a block diagram of an intelligent asset management system.

The present invention is generally directed to systems and methods for tagging, connecting, managing, locating, generating artificial intelligence from, and monitoring assets that traditionally are not connected to other devices and are not operable to be connected to a network.

In one embodiment, the present invention provides a system for asset management comprising at least one tag attached to at least one asset, an asset management platform including a server with a processor and a memory, wherein the asset management platform includes an alert engine, wherein the at least one tag includes at least one sensor, wherein the at least one tag is associated with asset data related to the at least one asset, wherein the asset data is configured to be displayed on a display device upon the display device reading the at least one tag, wherein the at least one sensor is configured to collect data related to the at least one asset and transmit the data to the asset management platform, wherein the data includes environmental data, location data, image data, video data, and/or audio data, and wherein the alert engine of the asset management platform is configured to send an alert to a device in communication with the platform based on the data.

In another embodiment, the present invention provides a system for asset management comprising at least one tag associated with at least one asset, an asset management platform including a server with a processor and a memory, wherein the at least one tag includes at least one sensor, wherein the at least one tag is associated with asset data related to the at least one asset, wherein the asset data is configured to be displayed on a display device upon the display device reading the at least one tag, wherein the at least one sensor is configured to collect data related to the at least one asset and transmit the data to the asset management platform, wherein the data includes environmental data, location data, image data, video data, and/or audio data, and wherein the asset management platform is configured to send an instruction to an Internet of Things (IoT) device to change a parameter of the device, activate the device, or deactivate the device based on the data.

In yet another embodiment, the present invention provides a system for asset management comprising at least one first tag attached to at least one first asset, at least one second tag attached to at least one second asset, an asset management platform including a server with a processor and a memory, wherein the asset management platform includes an analysis engine and an alert engine, wherein the at least one first tag includes at least one first sensor, wherein the at least one second tag includes at least one second sensor, wherein the at least one first tag is associated with asset data related to the at least one first asset, wherein the at least one second tag is associated with asset data related to the at least one second asset, wherein the asset data related to the at least one first asset is configured to be displayed on a display device upon the display device reading the at least one first tag, wherein the asset data related to the at least one second asset is configured to be displayed on a display device upon the display device reading the at least one second tag, wherein the at least one first sensor is configured to collect data related to the at least one first asset and transmit the data related to the at least one first asset to the asset management platform, wherein the at least one second sensor is configured to collect data related to the at least one first second and transmit the data related to the at least one second asset to the asset management platform, wherein the data related to the first asset and the data related to the second asset includes environmental data, location data, image data, video data, and/or audio data, and wherein the analysis engine is configured to compare the data related to the first asset to a predetermined value for the first asset, wherein the analysis engine is configured to compare the data related to the second asset to a predetermined value for the second asset, and wherein the alert engine is configured to send an alert or an instruction to a device in communication with the platform upon the data related to the first asset meeting or exceeding the predetermined value for the first asset and the data related to the second asset meeting or exceeding the predetermined value for the second asset.

Businesses and individuals own and are responsible for a growing number of physical assets of all sizes, shapes, and types. Because most of these things are not connected to a network, it is difficult to organize, locate, monitor, secure, authenticate, share, manage, and/or generate intelligence from them. These "unconnected assets" (or "dumb" assets) which lack any networking functionality or capabilities include, but are not limited to, manufacturing inventories, office equipment, medical equipment, mobile equipment, tools, supplies, artwork, and furniture, among an almost unlimited list of unconnected physical things. Despite the growing number of connected things, most all things in the world are still not connected, thus creating a need for solutions to organize, locate, monitor, secure, authenticate, share, manage, and/or generate intelligence from unconnected things.

Having the ability to tag and connect these unconnected assets in a secure and immutable way makes them smart and creates the ability to better organize, locate, monitor, secure, authenticate, share, manage, and/or generate intelligence from them. Moreover, the present invention provides a platform for users to collect data about an asset and its environment as well as assign data to the asset to create valuable and actionable intelligence as well as automation and workflows.

The present invention utilizes an intelligent asset management platform for monitoring, locating, and providing intelligence for at least one tagged asset or any group of tagged assets. The platform is operable to allow users to register any tagged asset to the user's account, including, but not limited to, dumb assets and/or non-network enabled assets (e.g., furniture, medical equipment, manufacturing inventory, etc.). In one embodiment, the platform also includes a smart tag that connects to a remote device, a disc, a hub, and/or directly to the Internet. The remote device, the smart tag, the disc, and/or the hub is operable to transmit data to the platform in real-time or near real-time including, but not limited to, data related to location, velocity, speed, altitude, temperature, humidity, weight, size, dimensions, mass, density, a sound, an image, and/or a video of any asset. Once tagged assets are registered with the platform, Machine Learning (ML), Deep Learning (DL), and/or Artificial Intelligence (AI) are deployed to assist in providing intelligence regarding the tagged assets, such as product support and upgrades for tagged assets, repair and maintenance notifications for tagged assets, user engagement with the platform, and/or market research specific to the tagged assets. The system is also operable to manage measurements and/or data related to any tagged asset and provide detailed reporting, alerts, and initiate actions based on the measurements and/or data.

None of the prior art discloses the use of Artificial Intelligence (AI), Machine Learning (ML), and/or Deep Learning (DL) in conjunction with an intelligent asset management platform for tagging, monitoring, and managing a user's inventory, including "dumb" assets and/or non-network enabled assets, wherein the platform is operable to initiate actions based on measurements obtained regarding the state of the assets within the user's inventory. Advantageously, the present invention allows for patterns related to the asset to be learned, allowing for the patterns related to the asset to be used to initiate actions (e.g., in network connected devices) and/or to be reported to the user. For example, the platform is operable to provide users with recommendations related to the tagged assets. Therefore, the present invention provides a level of management and convenience not provided by assets lacking network connectivity.

Referring now to the drawings in general, the illustrations are for the purpose of describing one or more preferred embodiments of the invention and are not intended to limit the invention thereto.

FIG. 1 is a block diagram of one embodiment of the intelligent asset management system 50. The intelligent asset management system 50 includes at least one remote server 100 and at least one remote device 200 in network communication with each other and with at least one tag 300, at least one disc 400, and/or at least one hub 500. The intelligent asset management system 50 is configured to collect, process, analyze, model, and present data related to the at least one tag 300 associated with at least one asset. The intelligent asset management system 50 is configured to determine real-time or near-real-time conditions of the at least one tag 300 associated with at least one asset. The intelligent asset management system 50 is further operable to initiate at least one action in response to conditions related to the at least one tag 300 and/or the at least one asset. In one embodiment, the intelligent asset management system 50 further includes at least one network-enabled device 600. The at least one network-enabled device 600 is in network communication with the at least one remote server 100 and/or the at least one remote device 200. In a preferred embodiment, the at least one network-enabled device 600 is operable to receive commands from the at least one remote server 100 and/or the at least one remote device 200. For example, and not limitation, the at least one network-enabled device is a smart refrigerator and is operable to receive commands related to temperature from the at least one remote server and/or the at least one remote device.

The at least one remote server 100 includes a plurality of engines, at least one processor, and at least one memory. The plurality of engines includes, but is not limited to, a learning engine 102, an analytics engine 104, an image processing engine 106, a video processing engine 108, an audio processing engine 110, an alert engine 112, and/or a Bayesian inference engine 114. Preferably, each engine is operable to receive data from at least one other engine of the plurality of engines. For example, and not limitation, the analytics engine is configured to receive data from all of the other engines of the plurality of engines to provide an analysis of every aspect of the assets. In one embodiment, the at least one remote server 100 is a cloud-based server. The at least one remote server 100 preferably includes at least one database 116. The at least one database 116 is operable to store information including, but not limited to, information related to at least one user, at least one tag, at least one tagged asset, location data, and/or environmental data. For example, and not limitation, the information is operable to include weather, temperature in a building, police reports, video from a TV news source (e.g., public TV news source), audio from news radio or police radio, pictures or video posted on social media, a number of users on a social media account, social media data, and/or Metaverse data. In one embodiment, the at least one remote server includes a web crawler 118.

In one embodiment, the system is operable to leverage a Bayesian inference engine 114. Unlike in a normal decision tree or a flow process, every node (tag) connected to this network is operable to infer its state to all other nodes (tags) connected to the network, so every tag knows about every other tag. Unlike any other intelligence system, this embodiment enables information flow in all directions at all times. This is unlike a left to right logic or branching logic. For example, and not limitation, if the weight of the asset of a first tag is less than 45 kg (99.2 lbs.) and the temperature of the environment of the asset of a second tag is greater than 32° C. (89.6° F.) and it is not raining outside, then open the spigot and water the plants located near the asset of the second tag. Another example is if in the next 48 hours less than 100 tags are scanned in at physical location warehouse A and during the same period if there are less than 50 tags in physical location warehouse B and less than 10 tags in physical location warehouse C, then represent this as an alarm event and/or send an alert (e.g., an email, text message) to the shipping manager.

The at least one remote device 200 includes, but is not limited to, a smartphone, a tablet, a laptop computer, and/or a desktop computer. The at least one remote device 200 includes at least one processor 202, a control interface 206, a user interface 208 (e.g., a graphical user interface (GUI)), and local storage 250 (e.g., at least one memory). The at least one remote device 200 is operable to receive data from the at least one remote server 100 and to transmit data to the at least one remote server 100. In one embodiment, the at least one remote device 200 is further operable to receive data from the at least one tag 300, the at least one disc 400, and/or the at least one hub 500. The at least one remote device 200 is operable to store data in the local storage 250.

The local storage 250 on the at least one remote device 200 preferably includes a user profile 252. The user profile 252 stores user preferences and information including, but not limited to, user information (e.g., name, email address, phone number, address, contact information), information related to tags connected to assets associated with the user profile, information related to the assets, financial data (e.g., credit card information, bank account information, credit limit), permissions, priorities, groups, group membership, environmental data, and/or location data. The historical data 254 includes, but is not limited to, previous assets, previous tags, and historical data related to previous and/or current assets and tags (e.g., environmental data related to the previous and/or current assets and tags).

Tags

Figure 2:
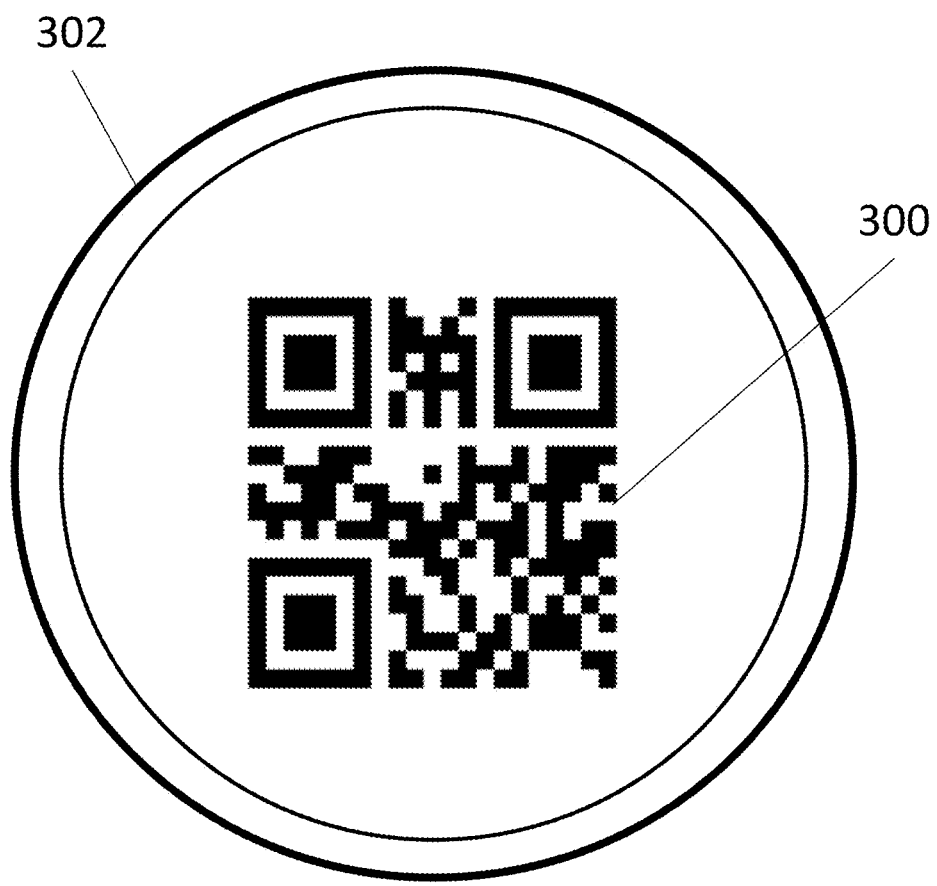
FIG. 2 illustrates one embodiment of a tagged asset

FIG. 2 illustrates one embodiment of a tagged asset. At least one asset 302 is operable to have at least one tag 300 affixed to it.

An asset is a non-network enabled item of the user that is operable to be connected to the intelligent asset management system. Non-network enabled items are things which do not have the capability for independent network connectivity including, but not limited to, medical equipment (e.g., stretchers, defibrillators, surgery tools), manufacturing items (e.g., boxes or pallets of inventory, forklift, generator, excavators), office equipment (e.g., monitors, cables, calculators), hospitality assets (e.g., pool equipment, vacuum cleaners), and/or tools. Non-network enabled items also are things that are not electrical including, but not limited to, furniture, art pieces, historical artifacts, antiques of any kind, sports memorabilia, and/or portable equipment (e.g., pressure washer). The tag 300 is irremovably or removably attached to the asset 302.

In one embodiment, tagging uses automatic identification and data capture (AIDC) technologies. AIDC refers to the methods of automatically identifying objects, collecting data about the objects, and entering data into computer systems, without human involvement. Technologies considered as part of AIDC include, but are not limited to, Near Field Communications (NFC), Quick Response (QR) codes, bar codes, radio frequency identification (RFID), Universal Product Code (UPC), biometrics, magnetic strips, Optical Character Recognition (OCR), smart cards, video analysis, and/or voice recognition.

AIDC is the process of obtaining external data, through the analysis of images, sounds, or videos. To capture data, a transducer is employed which converts an actual image, a video, and/or a sound into a digital file. The digital file is then stored and later analyzed by a computing device or compared against other files in a database to verify identity or to provide authorization to enter a secured system.

In one embodiment, the tag is a QR code. QR codes are a type of matrix barcode, or two-dimensional (2D) barcode. QR codes contain data for a locator, identifier, and/or tracker that connects to a website or application. A QR code uses four standardized encoding modes (numeric, alphanumeric, byte/binary, and kanji) to share data efficiently. QR codes enable anything to be turned into an interaction point capable of performing a digital task or experience.

In another embodiment, the tag is a barcode.

In another embodiment, the tag is a Stock Keeping Unit (SKU).

In another embodiment, the tag is a UPC tag.

In another embodiment, the tag is a magnetic tag.

In another embodiment, the tag is a near field communication (NFC) tag. NFC is a set of communication protocols that enable two devices to establish communication by bringing the devices close to each other.

In one embodiment, the tag is an RFID tag. RFID uses electromagnetic fields to automatically identify and track tags attached to objects. The tags contain electronically stored information. Passive tags collect energy from a nearby RFID reader's interrogating radio waves. Active tags have a local power source and operate remotely from an RFID reader. Unlike a barcode, the tags do not need to be within a line of sight of the RFID reader. In one embodiment, the RFID tag is embedded in an object.

In one embodiment, the tag is a combination of an RFID tag and a QR code. In another embodiment, the tag is a combination of an NFC tag and a QR code.

In one embodiment, a tag uses a Passive Reader Active Tag (PRAT) system. A PRAT system has a passive reader which only receives radio signals from active tags. The reception range of a PRAT system reader is operable to be adjusted from about 1 foot to about 2,000 feet.

In one embodiment, a tag uses an Active Reader Passive Tag (ARPT) system. An ARPT system uses an active reader, which transmits interrogator signals and also receives authentication replies from passive tags.

In one embodiment, a tag uses an Active Reader Active Tag (ARAT) system. An ARAT system uses active tags that are awoken with an interrogator signal from an active reader. In another embodiment, the ARAT system uses a Battery-Assisted Passive (BAP) tag, acting like a passive tag but with a small battery to power the tag's return reporting signal.

In another embodiment, the tag is a chipless RFID tag. Chipless RFID tags are RFID tags that do not require a microchip in the transponder. Chipless RFID tags use either time-domain reflectometry or frequency signature techniques. In time-domain reflectometry techniques, the interrogator sends a pulse and listens for echoes. The time of pulse arrivals encodes the data. In frequency signature techniques, the interrogator sends waves of several frequencies, a broadband pulse or a chirp, and monitors the echoes' frequency content. The presence or absence of certain frequency components in the received waves encodes the data.

Chemicals, magnetic materials, or resonant circuits are used to attenuate or absorb radiation of a particular frequency.

In one embodiment, the tag is a SNAPTAG. A SNAPTAG is a 2D mobile barcode alternative similar to a QR code, but uses an icon or company logo and code ring rather than a square pattern of black dots. A SNAPTAG is operable to be used to take consumers to a brand's website or mobile application, and is also operable to facilitate mobile purchases, coupon downloads, free sample requests, video views, promotional entries, FACEBOOK likes, PINTEREST Pins, and/or TWITTER Follows, Posts, and Tweets. In addition, a SNAPTAG offers back-end data mining capabilities. See, e.g., U.S. Pat. Nos. 8,094,870; 8,462,986; 8,971,566; and 9,336,474, each of which is incorporated herein by reference in its entirety.

In another embodiment, the tag is a combination of at least two tag types including, but not limited to, NFC tags, RFID tags, QR codes, SNAPTAGS, ARAT tags, Chipless RFID tags, PRAT tags, barcode, and/or SKU.

In yet another embodiment, the tag is a single tag with at least two of the previously mentioned tagging technologies built into the single tag. For example, older mobile devices do not have NFC capabilities and would only be operable to interact with a QR code. Another example includes combining UPC and NFC in one tag. In this example, a UPC code is already assigned to an asset as a general reference (e.g., a 750 ml bottle of JACK DANIELS) and the NFC code gives that asset a specific and unique serial number. Advantageously, this embodiment allows for the tag to be operable using legacy technologies.

Tag size, shape, and/or color are operable to vary. In one embodiment, a tag is operable for indoor and/or outdoor use. In another embodiment, a tag is permanent. In another embodiment, a tag is temporary. In yet another embodiment, a tag is a custom design and/or custom text defined by a user. In yet another embodiment, the tag is a logo.

Tags operable for indoor use include, but are not limited to, direct thermal paper tags, direct thermal plastic tags, thermal transfer paper tags, thermal transfer plastic tags, thermal transfer polyester tags, synthetic tags, chemical-resistant polyester tags, retro-reflective tags, gloss-coated plastic tags, paper tags, litho paper tags, high gloss paper tags, semi-gloss paper tags, foil paper tags, vinyl tags, static cling vinyl tags, polypropylene tags, polyethylene tags, flexible printed circuit tags, silicone tags, polyimide tags, acrylonitrile butadiene styrene (ABS) tags, aluminum tags, copper tags, metal coil tags, fluorescent tags, permanent adhesive tags, tags with a removable adhesive, and/or tags with a repositionable adhesive.

Tags operable for outdoor use include, but are not limited to, polyethylene tags, flexible printed circuit tags, silicone tags, polyimide tags, ABS tags, paper tags, aluminum tags, copper tags, metal coil tags, tags where the graphics are sealed beneath a sapphire-hard anodic layer of metal, laminated tag stickers, high-temperature metal tags, stainless steel tag labels, polyester tags with a permanent pressure-sensitive adhesive, and/or tags requiring a one-time application of a paint mask.

In one embodiment, tags are water-resistant and/or waterproof. Additionally, or alternatively, tags are operable to be used in temperatures between about −30° C. (−22° F.) and about 60° C. (140° F.). In another embodiment, tags are operable to be used in temperatures up to 870° C. (1598° F.). In yet another embodiment, tags are operable to be used in temperatures up to 1510° C. (2750° F.).

In one embodiment, the tag incorporates at least two types of indoor and/or outdoor tag types and/or technologies.

In one embodiment, the tag further includes at least one sensor and is configured for network communication with the at least one remote server, the at least one mobile device, the at least one smart disc, and/or the at least one hub. The at least one sensor includes, but is not limited to, a location sensor (e.g., global positionings system (GPS) device), an environmental sensor (e.g., a temperature sensor, a humidity sensor, an accelerometer, a light sensor, an ultraviolet (UV) sensor, a noise sensor, a radiation sensor, a chemical sensor (e.g., airborne chemicals)), a weight sensor, a size sensor, a pressure sensor, an image and/or video sensor (e.g., a camera), and/or an audio sensor (e.g., a microphone). This allows for the tag to collect and analyze environmental data, location data, image data, video data, and/or audio data related to the tag and/or asset and transmit the environmental data, the location data, the image data, the video data, and/or the audio data to the at least one remote server, the at least one remote device, the at least one smart disc, and/or the least one hub.

Figure 3:
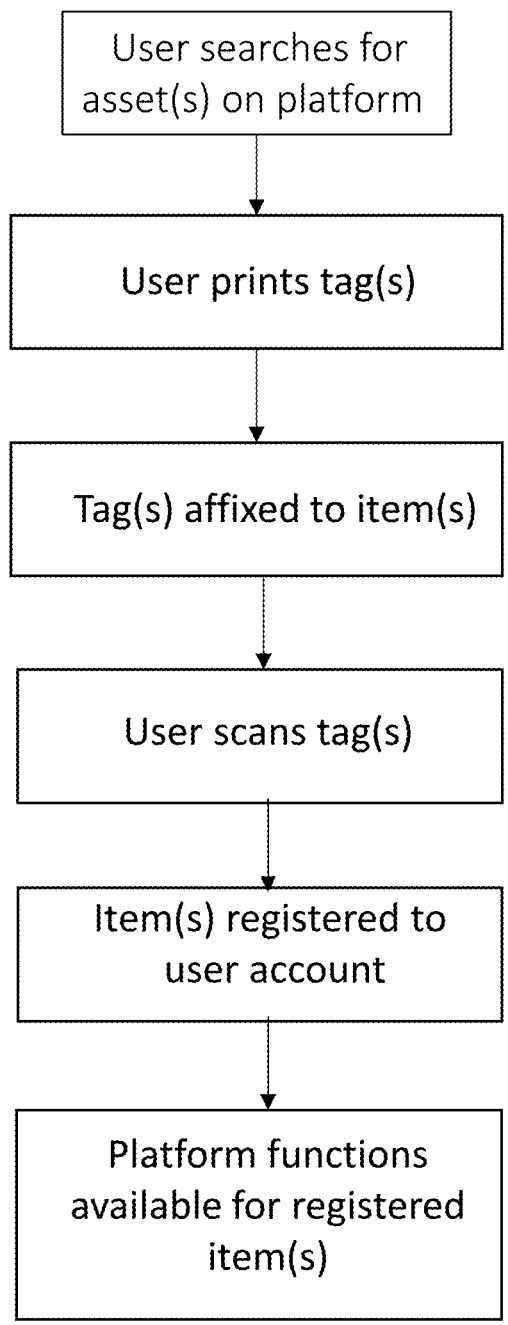
FIG. 3 illustrates one embodiment of a method for connecting and registering an asset.

FIG. 3 illustrates one embodiment of a method for connecting and registering an asset. In one embodiment, an intelligent asset management platform is operable to be searched for at least one asset by a user. The platform returns the results of the search, wherein at least one search result matches the at least one asset. The platform is operable to select the at least one search result matching the at least one asset based on user input. In one embodiment, the platform is operable to print at least one tag for the at least one asset. The at least one tag is affixed or attached to the at least one asset by the user. In one embodiment, using a remote device (e.g., smartphone, tablet), the at least one tag on the at least one asset is scanned into the platform by the user. The scanned asset is then registered to the user's account. In one embodiment, the scanned asset is automatically registered to the user's account. In another embodiment, the scanned asset is manually registered to the user's account, enabling the editing of scanned asset information. In an alternative embodiment, tags are available for a user to purchase. Once a tag has been acquired by the user (e.g., purchased), the tag is operable to be attached to an asset by the user. After tagging the asset, the remote device is operable to scan the at least one tag and/or the at least one asset to associate the tag with the user account. In one embodiment, the platform prompts for information regarding the tagged asset to be input into the remote device by the user. Information regarding the tagged asset includes, but is not limited to, an identity, a color, a condition, a size, a weight, and/or a shape of the tagged asset. In an alternative embodiment, information regarding the tagged asset is automatically collected by the platform when the tagged asset is scanned using a camera associated with the remote device (e.g., a smartphone camera). In one embodiment, the platform provides a prompt on the remote device to take an image and/or video of the tagged asset using the associated camera (e.g., the smartphone camera). The media is then associated with the tagged asset and processed by the platform to determine information regarding the tagged asset. The platform then automatically associates this information with the tagged asset. In one embodiment, the platform incorporates computer vision to automatically collect the information regarding the tagged asset. In one embodiment, if information cannot be determined by the platform automatically, the platform prompts for any information about the tagged asset that could not be identified by the platform. In another embodiment, the platform prompts for confirmation about the information obtained through the scan (e.g., using computer vision).

The platform enables a variety of functions to be performed for tagged assets registered with the platform including, but not limited to, selling the at least one tagged asset, trading the at least one tagged asset with at least one other user, loaning the at least one tagged asset to at least one other user, locating accessories for the at least one tagged asset, locating add-ons for the at least one tagged asset, tracking and selling services for the at least one tagged asset, tracking maintenance on the at least one tagged asset, marketing upgrades for the at least one tagged asset, selling upgrades for the at least one tagged asset, marketing affiliated products and services for the at least one tagged asset, selling affiliated products and services for the at least one tagged asset, creating social communities for the at least one tagged asset, sharing information related to the at least one tagged asset on at least one linked social media account, authenticating the at least one tagged asset, tracking the location of the at least one tagged asset, accessing self-service for the at least one tagged asset, accessing support for the at least one tagged asset, and/or tracking the engagement of other users for the at least one tagged asset. Additional details about the marketplace are included in U.S. patent application Ser. No. 17/119,506, which is incorporated herein by reference in its entirety. Additional details about media files associated with assets as well as virtual assets and non-fungible tokens of assets are included in U.S. Provisional Patent Application No. 63/356,744 and U.S. Provisional Patent Application No. 63/356,761, each of which is incorporated herein by reference in its entirety.

Figure 4:
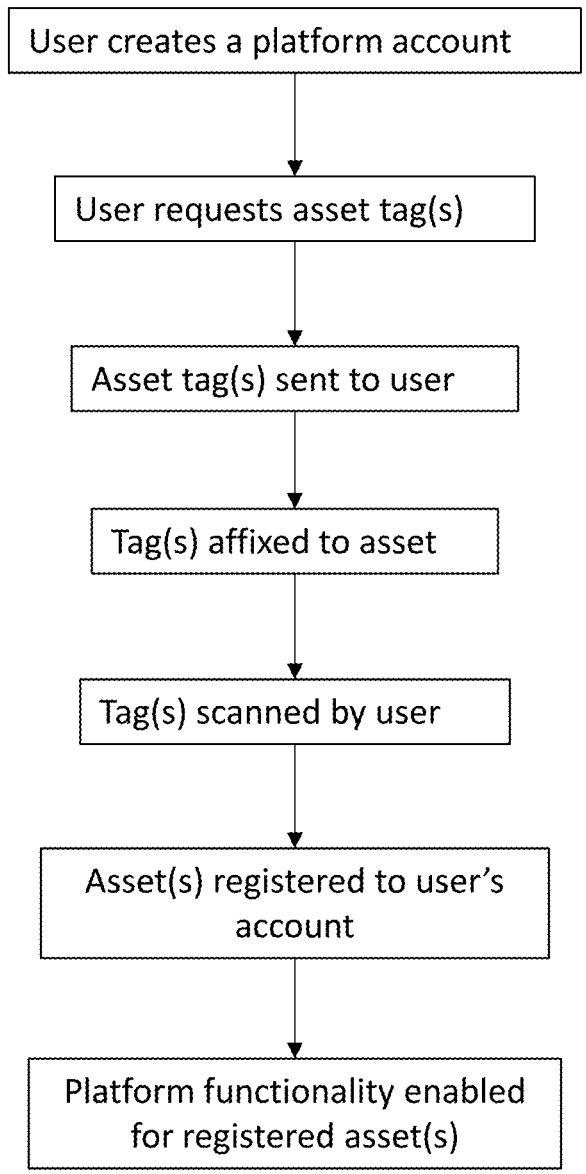
FIG. 4 illustrates another embodiment of a method for connecting and registering an asset.

FIG. 4 illustrates another embodiment of a method for connecting and registering an asset. In one embodiment, an account for the intelligent asset management platform and/or application is created on the platform by a user, at least one asset tag is requested from the intelligent asset management platform and/or application for at least one asset by the user, the at least one asset tag is sent to the user (e.g., printing, mail), the at least one asset tag is affixed to at least one asset by the user, the at least one asset tag is scanned using at least one user device (e.g., remote device), the at least one tagged asset is registered to the user's account, and platform functionality is enabled for the at least one tagged asset registered with the platform.

In one embodiment, an asset with a tag already affixed to it is acquired by a user. The tag is scanned using a remote device in order to connect and register the asset to the user's account. In a preferred embodiment, the remote device is in network communication with the application and/or the platform.

The tag is operable to authenticate the tagged asset, validate ownership of the tagged asset, track supply chain origin of all components of the tagged asset, and/or ensure the sustainability of the tagged asset.

Smart Disc

In one embodiment, a tagged asset is operable to interact with a smart disc. The smart disc is operable to read the tag data, weigh or measure the tagged asset, and/or confirm tag data using alerts including, but not limited to, sound, light, and/or sending an alert and/or notification to a remote device. In one embodiment, the smart disc includes a camera and/or a microphone to capture video data, image data, and/or audio data. In one embodiment, the smart disc includes at least one environmental sensor to capture environmental data and/or at least one location sensor to capture location data.

Figure 5:
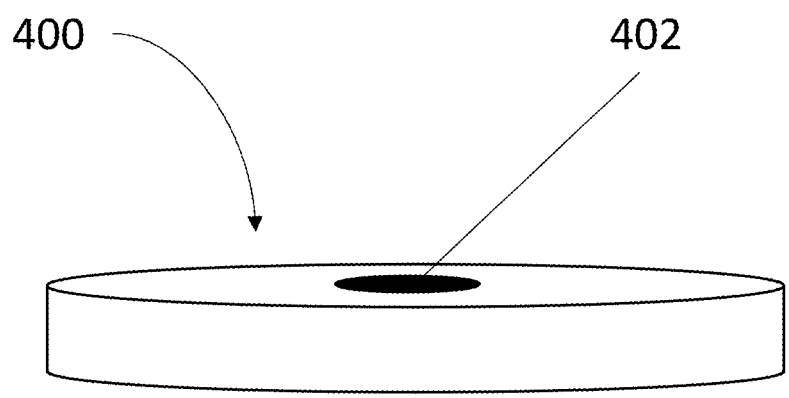
FIG. 5. illustrates one embodiment of a smart disc.

FIG. 5 illustrates one embodiment of a smart disc of the present invention. The smart disc 400 is operable to acquire data associated with a tagged asset including, but not limited to, measurements, weight, mass, dimensions, humidity, location, temperature, and/or density. For example, and not limitation, the smart disc 400 is operable to acquire a weight of a tagged asset. The smart disc 400 includes at least one tag sensor 402, wherein the at least one tag sensor 402 is operable to acquire tag data using technologies including, but not limited to, NFC tags, QR codes, RFID tags, OCR tags, photographs, video, infrared (IR) images, magnetic tags, smart card tags, and/or voice capturing technologies.

In one embodiment, whenever a tagged asset is placed on the smart disc or within range of the smart disc, the tag sensor in the smart disc acquires data relating to the condition of the tagged asset. This tracks details about the tagged asset every time it is placed on the smart disc or within range of the smart disc. The data acquired by the smart disc is then sent directly to the platform and stored in the at least one database. In one embodiment, the data acquired by the smart disc is transmitted to the platform in real time or near-real time.

In one embodiment, the smart disc is operable to connect directly to at least one other smart disc using network communication techniques and technologies, including, but not limited to, BLUETOOTH, NFC, cellular communication, and/or WI-FI. In one embodiment, a first smart disc is operable to transmit information associated with a tagged asset to a second smart disc.

In one embodiment, the smart disc is operable for network communication with the platform using cloud computing techniques and technologies. The smart disc connects to the platform directly using integrated network and/or cellular communication. In addition, the smart disc is operable for network communication with a data storage device and/or the remote device (e.g., using BLUETOOTH and/or WI-FI), wherein the data storage device is in network communication with the platform. In one embodiment, the data storage device is a local data storage device.

In another embodiment, the smart disc is connected to a cellular network. In one embodiment, the smart disc is Long-Term Evolution (LTE) connected. In another embodiment, the smart disc is connected to a Fifth Generation (5G) network.

In one embodiment, the smart disc is battery-operated. In another embodiment, the smart disc is powered using solar energy. In another embodiment, the smart disc is powered by a rechargeable battery. In yet another embodiment, the smart disc is powered by solar energy and at least one battery. In still another embodiment, the smart disc is powered by alternating current (AC) power and/or direct current (DC) power.

In one embodiment, each smart disc is waterproof. Alternatively, the smart disc is water-resistant.

In one embodiment, the smart disc is operable to send acquired data to the platform in real-time or near real-time. Alternatively, the smart disc is operable to send acquired data to the platform at a set interval (e.g., every 30 minutes, every hour, a predefined number of days, etc.) and/or after a measurement is taken.

In one embodiment, the smart disc is operable to determine when a tagged asset is located outside of a specified area and/or a threshold distance (e.g., radius) between the tagged asset and the smart disc using network communication techniques and technologies, including, but not limited to, BLUETOOTH, RFID, NFC, cellular communication, and/or WI-FI. In one embodiment, the system is operable to provide an alert (e.g., to the remote device) that the tagged asset is located outside of the specified area and/or the threshold distance between the tagged assets and the smart disc.

Figure 6:
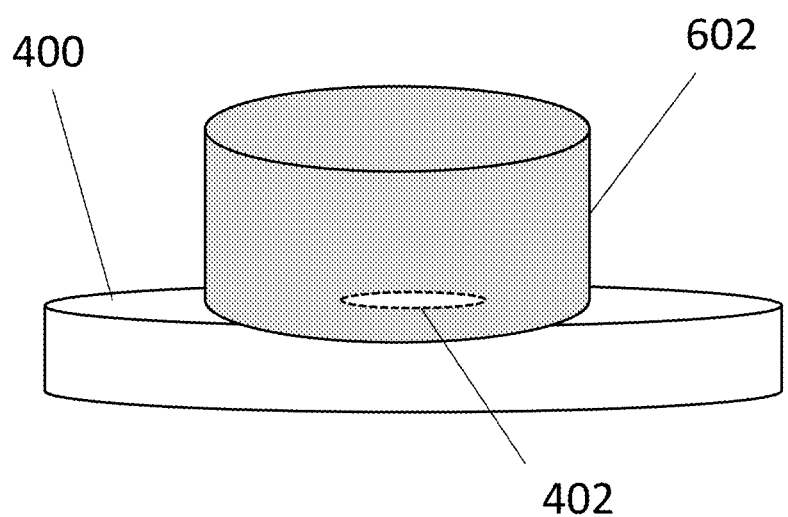
FIG. 6 illustrates one embodiment of a smart disc associated with a tagged asset.

FIG. 6 illustrates one embodiment of a smart disc interacting with a tagged asset. At least one smart disc 400 is operable to interact with at least one tagged asset 602 when the at least one tagged asset 602 is placed on or within range of the at least one smart disc 400, wherein the at least one smart disc 400 includes at least one tag sensor 402. The at least one tag sensor 402 is operable to read data from the at least one tagged asset 602 and/or write data to the at least one tagged asset 602 (e.g., firmware update).

Hub

In some embodiments, the system of the current invention includes at least one hub. In one embodiment, the at least one hub enables network communication between the platform and at least one smart disc and/or at least one tag. In one embodiment, the at least one hub enables network communication between at least two smart discs, wherein the hub is in network communication (e.g., wireless network communication) with the Internet. In one embodiment, the system provides wireless network communication including, but not limited to, BLUETOOTH, NFC, and/or WI-FI. In one embodiment, the at least one hub is further operable for network communication (e.g., wired or wireless) with the at least one platform. In one embodiment, the at least one hub includes a camera and/or a microphone to capture video data, image data, and/or audio data.

Figure 7:
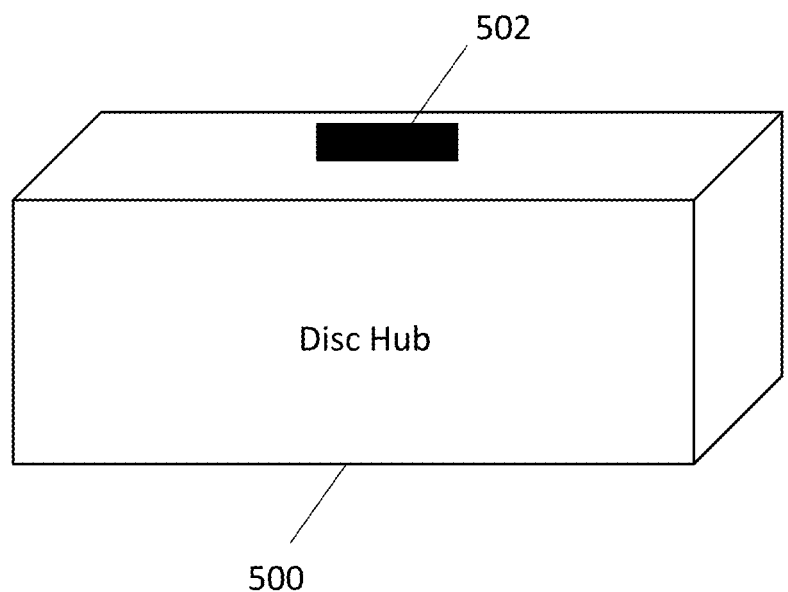
FIG. 7 illustrates one embodiment of a hub.

FIG. 7 illustrates one embodiment of a hub of the present invention. The hub 500 is operable to acquire data associated with a tagged asset including, but not limited to, environmental data and/or location data. The hub 500 is operable to acquire data associated with a tagged asset including, but not limited to, environmental data and/or location data. The hub 500 includes at least one hub sensor 502, wherein the at least one hub sensor 502 is operable to acquire tag and/or disc data using technologies including, but not limited to, NFC tags, QR codes, RFID tags, OCR tags, environmental sensors, location sensors, image sensors, video sensors, audio sensors, infrared (IR) image sensors, magnetic tags, smart card tags, and/or voice capturing technologies.

In an alternative embodiment, the hub enables network communication between at least one tag and the platform. In one embodiment, the hub enables network communication between at least two tags, wherein the hub is in network communication (e.g., wired or wireless) with the Internet. In one embodiment, the at least one tag is further operable for network communication with the at least one platform (e.g., independent of the hub).

Location Data

Tags, smart discs, and/or hubs of the system are operable to include at least one location sensor. The at least one location sensor is operable to obtain location data related to a location of a tagged asset and relay the location data to the platform. In one embodiment, the location of a tagged asset is obtained from a mobile phone or other remote device including a location sensor (e.g., Global Positioning System (GPS) device).

In a preferred embodiment, a tagged asset is operable to have its location tracked. In one embodiment, a location of the tagged asset is saved to an application and/or the platform when the tag is scanned.

In one embodiment, asset tracking is automatically enabled for at least one tagged asset when registered with the platform. In another embodiment, asset tracking is manually enabled for the at least one tagged asset when registered with the platform.

In one embodiment, a location of the at least one tagged asset is entered manually into the platform.

In one embodiment, an initial registration location (i.e., the location where an asset is initially registered) is stored on the platform and/or in the application.

In one embodiment, asset tracking is based on Global Positioning System (GPS). In one embodiment, the at least one tag includes a GPS sensor. In another embodiment, asset tracking is based on an Internet Protocol (IP) address. In another embodiment, asset tracking is based on a Media Access Control (MAC) address. In another embodiment, asset tracking is based on RFID. In yet another embodiment, asset tracking is based on a WI-FI positioning system. In yet another embodiment, tracking is based on asset fingerprint. In yet another embodiment, tracking is based on canvas fingerprinting. Canvas fingerprinting is a browser fingerprinting technique for tracking online users using the HTML 5 canvas element instead of browser cookies or other similar means. In yet another embodiment, tracking is based on geofencing. In one embodiment, tracking supports the W3C Geolocation standard.

In one embodiment, the system includes a geofence. In one embodiment, the geofence is defined using GPS, RFID, at least one beacon (e.g., BLUETOOTH LOW ENERGY), and/or at least one IP address. In one embodiment, if a tagged asset enters, leaves, and/or passes at least one predetermined geolocation (e.g., single geolocation, multiple geolocations) or a geolocation determined by the platform (e.g., automatic and/or intelligently determined), then at least one event is operable to be triggered. For example, and not limitation, a tagged asset is in a workflow and is supposed to be in a manufacturing location with a specific address and geolocation on specific days and at specific times. When the tagged asset successfully completes the workflow based on the manufacturing location, then an event (e.g., creation of a shipping label) is operable to occur. Further, the platform is operable to initiate a logistics system to ship the tagged asset.

In one embodiment, a tagged and tracked asset is operable to provide the user with an alert if the tagged and tracked asset changes its current location. Advantageously, this provides a notification the user if the tagged and tracked asset is stolen.

In one embodiment, location data is operable to be obtained from the tag itself. In one embodiment, location data is obtained from the smart discs. In one embodiment, location data is obtained from the hub. In alternative embodiments, location data is obtained from one of more of the at least one remote device, the at least one tag, the at least one smart disc, and/or the at least one hub.

For example, and not limitation, in one embodiment a facility or building includes a tag reader (e.g., NFC, RFID) at all exit and/or entry points. The tag reader is operable to determine if a tagged asset is being removed from the facility or building without authorization or permission. In one embodiment, the tag reader scans a tagged asset as it approaches an exit, sends data regarding the tagged asset to the platform, the platform determines the tagged asset does not have permission to leave the facility or building, and the platform sends an alert (e.g., text, email) and/or prevents the tagged asset from leaving the facility or building (e.g., by locking the door).

Environmental Data

In one embodiment, the system further includes environmental data related to the at least one tagged asset. In one embodiment, the environmental data is collected by the at least one tag, the at least one disc, and/or the at least one hub by at least one environmental sensor. The at least one environmental sensor includes, but is not limited to, a humidity sensor, an air quality sensor, a thermometer, a barometer, an altimeter, an image sensor (e.g., camera, charge-coupled device (CCD) sensor), a photoelectric sensor, a microphone, an accelerometer, a speedometer, a smoke detector, a fire detector, an infrared (IR) detector, a light detection and ranging (LiDAR) sensor, a radar sensor, an x-ray, a short-wave infrared (SWIR) sensor, and/or a volatile organic compound (VOC) detector. In one embodiment, one or more of the at least one environmental sensor is incorporated in the at least one tag, the at least one hub, and/or the at least one smart disc. In one embodiment, one sensor is operable to detect more than one environmental parameter.

For example, and not limitation, a tag is located in a room in a healthcare facility. The platform is operable to receive environmental data from the tag (e.g., room temperature). If the room temperature is outside of a predetermined threshold, the platform is operable to adjust a smart thermostat in the room or send an alert to a caregiver (e.g., nurse) to adjust the room temperature. In one example, the room temperature is supposed to be 25° C. (77° F.) with an allowed range of 24° C. (75.2° F.) to 26° C. (78.8° F.). If the room temperature is measured at 20° C. (68° F.), the platform adjusts a smart thermostat in the room or sends an alert (e.g., text, email) to a caregiver (e.g., nurse) to adjust the room temperature. Alternatively, the tag is operable to be read by a remote device (e.g., mobile phone) when a caregiver (e.g., nurse) checks on the patient. Advantageously, this embodiment also keeps a record of when the caregiver attended to the patient.

In an alternate embodiment, data regarding the environment of the tagged asset is determined using the location data provided by tracking the tagged asset. Data regarding the asset location is cross referenced with information relating to the environmental conditions associated with that location. This data is then assigned to the tagged asset as the environmental data. For example, if a tagged asset has a location in New York City, the system is then operable to use the location and cross-reference the location with an external or internal source to determine environmental parameters (e.g., temperature, humidity, UV index) at the location of the tagged asset. Sources of environmental data include, but are not limited to, third-party sources (e.g., National Weather Service). In one embodiment, the third-party sources are obtained via the Internet, a personal database, a public database, and/or at least one IoT device (e.g., NEST temperature system). In one embodiment, the at least one IoT device is connected to the same network as the at least one tagged asset. In one embodiment, the platform includes a web crawler operable to obtain data from the third-party sources.

As previously described, in one embodiment, data related to the at least one tagged asset is operable to be collected by at least one sensor included in the at least one tag, the at least one remote device, the at least one disc, and/or the at least one hub. In one embodiment, if the system fails to obtain the environmental data, for reasons including, but not limited to, hardware malfunction, environmental data is instead recorded into the system based on the location of the tagged asset.

In certain embodiments, the at least one tag, the at least one disc, and/or the at least one hub are optionally operable to include other sensors to collect data regarding the state of the tagged asset that are advantageous for a specific application. These sensors include, but are not limited to, weight sensors, volume sensors, pressure sensors, piezoelectric sensors, etc.

Application

As previously described, the at least one tag and/or the at least one tagged asset are registered with an intelligent asset management platform. The intelligent asset management platform preferably provides a graphical user interface (GUI) operable for user interaction.

In one embodiment, the intelligent asset management platform includes a mobile application. In one embodiment, the mobile application is a native mobile application. Native mobile applications are built for a specific platform with the platform Software Development Kit (SDK), tools, and languages, typically provided by the platform vendor. Examples include, but are not limited to, xCode/Objective-C for iOS, Eclipse/Java for Android, Visual Studio/C # for Windows Phones. In another embodiment, the mobile application is a mobile web (Mobile Web) application. Mobile Web applications are server-side applications, built with any server-side technology including, but not limited to, PHP, Node.js, and ASP.NET, that render Hypertext Markup Language (HTML) that has been styled so that it renders well on a device form factor.

In another embodiment, the at least one tag and/or the at least one tagged asset is connected to the intelligent asset management platform via a web interface.

In another embodiment, the intelligent asset management platform includes a hybrid mobile application (Hybrid App). A Hybrid App is an application that is written with the same technology used for websites and mobile web implementations, and that is hosted or runs inside a native container on a mobile device. Hybrid Apps use a web view control to present the HTML and JAVASCRIPT files in a full-screen format, using the native browser rendering engine and not the browser itself. For example, WEBKIT is the browser rendering engine that is used on IOS, ANDROID, BLACKBERRY, SAFARI, MAIL, APP STORE, and others. This means that the HTML and JAVASCRIPT used to construct a Hybrid App are rendered/processed by the WEBKIT rendering engine and displayed to the user in a full-screen web view control, not in a browser. In addition, Hybrid Apps implement an abstraction layer that exposes the device capabilities, native Application Programming Interfaces (APIs), to the Hybrid App as a JAVASCRIPT API. This is not possible with Mobile Web application implementations because of the security boundary between the browser and the device APIs. Through this abstraction layer, a common set of APIs is exposed in JAVASCRIPT, and these JAVASCRIPT APIs work on any device supported by the framework.

In one embodiment, the browser rendering engine is Gecko. In another embodiment, the browser rendering engine is Goanna. In another embodiment, the browser rendering engine is KHTML. In another embodiment, the browser rendering engine is Presto. In another embodiment, the browser rendering engine is Tasman. In another embodiment, the browser rendering engine is Trident. In another embodiment, the browser rendering engine is Blink. In yet another embodiment, the browser rendering engine is Servo. In yet another embodiment, the browser rendering engine is EdgeHTML. In another embodiment, the application includes both a remote application and a desktop application.

The present invention is operable to provide applications including, but not limited to, a base application and/or an SDK for custom applications. The SDK for custom applications enables functionality including, but not limited to, registration, selling, support, maintenance, service, education, and/or marketing.

The application is operable to tag assets, register tagged assets to the platform, and/or manage tagged assets.

Authentication

For sensitive applications, adding a second authentication method and/or factor is appropriate (also known as "two-factor authentication"). This includes applications that provide access to sensitive information (e.g., credit card numbers, bank account information) or allow transfer of funds. Mobile applications use HyperText Transfer Protocol (HTTP) as the transport layer. The HTTP protocol itself is stateless, so there must be a way to associate a user's subsequent HTTP requests with that user; otherwise, the user's log in credentials would need to be sent with every request. In one embodiment, the second authentication method is stateful authentication. Stateful authentication generates a unique session ID when the user logs in. In subsequent requests, this session ID serves as a reference to the user details stored on the server. The session ID is opaque, in that it does not contain any user data. In one embodiment, the session ID is random. In one embodiment, the second authentication method is stateless authentication. With stateless authentication, all user-identifying information is stored in a client-side token. The token is passed to any server or micro service, eliminating the need to maintain a session state on the server. Stateless authentication is often factored out to an authorization server, which produces, signs, and encrypts the token upon user login.

In one embodiment, the second authentication method is an additional user password, wherein the additional user password is distinct from the user's original account password. In one embodiment, the second authentication method is a PIN number. In another embodiment, the second authentication method is a user-created pattern on a mobile computing device. In yet another embodiment, the second authentication method is a one-time password generator. In yet another embodiment, the second authentication method is a hardware token generating a one-time password. In yet another embodiment, the second authentication method is user biometric data. User biometric data includes, but is not limited to, a fingerprint, a retinal scan, a haptic vein scan, facial recognition, voice recognition, and/or ear recognition. In one embodiment, the second authentication method is a passive contextual authentication. The passive contextual authentication includes, but is not limited to, geolocation, IP address, time of day, and/or the device being used by the user (e.g., MAC address).

In one embodiment, the second authentication method uses the OWASP Mobile AppSpec Verification Standards (MASVS). MASVS is split into two authentication levels. In one embodiment, the MASVS level is level one. Level one MASVS functions with non-critical applications and suggests the following authentication requirements: if the app provides users with access to a remote service, an acceptable form of authentication such as username and/or password authentication is performed at the remote endpoint; a password policy exists and is enforced at the remote endpoint; the remote endpoint implements an exponential back-off, or temporarily locks the user account when incorrect authentication credentials are submitted an excessive number of times.

In one embodiment, the MASVS level is level two. Level two MASVS functions with sensitive applications and includes the following, in addition to the level one requirements: a second factor of authentication exists at the remote endpoint and the second factor authentication requirement is consistently enforced; step-up authentication is required to enable actions that deal with sensitive data and/or transactions; the application informs the user of the recent activities with their account when they log in.

In one embodiment, two-factor authentication (2FA) functionality is enabled (e.g., via user input).

In another embodiment, single sign-on (SSO) functionality is enabled (e.g., via user input). SSO is a property of access control of multiple related, yet independent software systems. With this property, a user logs in with a single ID and password to gain access to any of several systems. In one embodiment, SSO uses a Lightweight Directory Access Protocol (LDAP) and stored LDAP databases on servers. In another embodiment, SSO uses cookies. In one embodiment, SSO is Kerberos-based, wherein the initial sign-on prompts the user for credentials and gets a Kerberos ticket-granting Ticket (TGT). In one embodiment, SSO is smart-card-based, wherein initial sign-on prompts the user for the smart card. Additional software applications also use the smart card, without prompting the user to re-enter credentials. Smart-card-based SSO is operable to use certificates and/or passwords stored on the smart card. In one embodiment, SSO is based on a Security Assertion Markup Language (SAML). SAML is an XML-based method for exchanging user security information between an SAML identity provider and a SAML service provider.

User account information is operable for editing after the account is created. In addition, the platform provides an account profile page (e.g., via the GUI). The account profile page is operable to display information associated with the user's account including, but not limited to, available payment methods, a list of tagged assets registered with the user account, user account settings, user reviews, and/or shortcuts to the user's dashboard.

In one embodiment, an existing social media account is linked to the intelligent asset management platform. Examples of social media accounts operable to be linked with the platform include, but are not limited to, META, FACEBOOK, TWITTER, INSTAGRAM, SNAPCHAT, LINKEDIN, TUMBLR, PINTEREST, SINA WEIBO, REDDIT, TIKTOK, VKONTAKTE, FLICKR, MEETUP, INTERNATIONS, XING, and/or NEXTDOOR.

After an account is created, a tagged asset is operable to be registered with a user's account by scanning and/or reading the tag associated with the tagged asset.

Additionally, the intelligent asset management platform allows actions including, but not limited to, selling tagged assets associated with the user account, buying tagged assets from other user accounts, loaning tagged assets to other users, borrowing tagged assets from other users, renting tagged assets to other users, renting tagged assets from other users, trading tagged assets with other users, reviewing tagged assets, and/or reviewing purchased tagged assets.

Once registered, tagged assets associated with a user account are listed on the intelligent asset management platform. In one embodiment, a tagged asset's view is set to private, wherein only user-selected accounts have access to the tagged asset's information. In another embodiment, a tagged asset's view is set to public, wherein any user of the intelligent asset management platform is allowed to view the tagged asset's information. Tagged asset information includes, but is not limited to, manufacturer(s), model number, product name, date of packaging, previous ownership, current market value, historical market value, previous purchase price(s), purchase date(s), asset condition, current location, asset review score, serial number, weight, size, SKU number, warranty expiration date, and/or custom user notes.

Tagged assets registered with the platform are operable to be associated with a manufacturer of the tagged asset. The platform is operable to provide alerts and/or reminders about events associated with a tagged asset, including, but not limited to, maintenance, repair(s), selling and/or offering product refills associated with the tagged asset, availability of accessories, and/or add-ons for the tagged asset, services associated with the tagged asset, and/or loan date.

Tagged assets that are associated with a user account are operable to be assigned actions in the platform based on location data and/or environmental data. Actions are operable to be set based on certain conditionals set by the user regarding the location of the tagged asset and/or current and/or predicted environmental conditions represented by the environmental data and/or forecasted environmental data (e.g., via third-party sources). Actions include, but are not limited to, an alert (e.g., short message service (SMS) messages, push notifications, in-app messages, rich communication services, emails, etc.) and/or actions sent to other network-enabled devices (e.g., smart cars, smart televisions, smart air conditioners, smart trains, etc.). Additional details regarding actions performed within the system are presented below.

Account Types

In some embodiments, the platform includes more than one user account type. Examples of such account types include, but are not limited to, an administrator, an employee, an owner, a manager, a repair person, a maintenance person, a security guard, a parent, a child, a teacher, a student, a general user, etc. In one embodiment, the platform provides different permissions based on the account type. In a non-limiting example, a parent and a child create accounts on the application. The parent is listed as a parent to the child and is permitted full access to the child account. The parent account is operable to both track and collect data on tagged assets associated with both the child account and the parent account. In a further non-limiting example, a child account is not able to tag any new assets and/or any new assets of a specific class unless a parent account assigns the asset to the child or enters credentials of the parent account to provide permission to the child account. In another non-limiting example, a parent account is operable to set actions for tagged assets associated with both the child account and the parent account while the child account is only allowed to set actions for tagged assets associated with the child account. In one embodiment, a parent account is operable to lock certain tagged assets associated with the child account to prevent the child account from assigning actions to tagged assets other than those allowed by the parent. Similar permission rules are operable to be enforced for relationships other than parent-child including, but not limited to, administrator-employee, teacher-student, etc.

Permission rules are preferably designated for each associated account and are operable to be different for similar account types. For example, an administrator account is associated with a first employee account, a second employee account, and a third employee account having a first set of permissions, a second set of permissions, and a third set of permissions, respectively. The first set of permissions is not equivalent to the second set of permissions, and the second set of permissions is not equivalent to the third set of permissions.

In one embodiment, the platform allows for fractional ownership of an asset. In one embodiment, the permission rules governance of the fractional ownership of the asset. For example, and not limitation, a first owner has an 80% interest in an asset and a second owner has a 20% interest in the asset. The first owner is authorized to sell the asset. In one example, the first owner requires permission from the second owner to sell the asset. Alternatively, the first owner does not require permission from the second owner to sell the asset. The platform is operable to sell the tagged asset and split the proceeds between the first owner and the second owner (e.g., proportionally according to ownership, according to permission rules). In one example, the platform obtains a commission for the sale of the asset.

Artificial Intelligence

Artificial Intelligence (AI) can be divided into two disciplines: Machine Learning (ML) and Deep Learning (DL). ML involves the creation of computers and software that are operable to learn from data, and then apply that knowledge to brand new data sets. DL creates neural networks, designed to resemble the human brain, and is used to process data including, but not limited to, sounds and images. AI cannot function without data. "Big Data" refers to the massive sets of data that are required and available for AI. Big Data sets are operable to be structured data including, but not limited to, transactional data in a relational database, and less structured or unstructured data, including, but not limited to, images, email data, and/or sensor data. These data sets are operable to be analyzed to find patterns, trends, and facilitate making future predictions and support automation and workflows.

ML algorithms provide effective automated tools for data collection, analysis, and integration. When combined with cloud computing power, ML enables fast and thorough processing and integration of large amounts of various information. ML algorithms are operable to be applied to every element of a Big Data operation including, but not limited to, data labeling and/or segmentation, data analytics, diagnostics, planning, prediction, automation, workflow, and/or scenario simulation.

In one embodiment, AI, ML, and/or DL is used to predict actions of interest to a user based on patterns in the tagged asset's associated environmental data, location data, and/or data collected from the remote device, the smart disc, the hub, and/or third-party sources. In one embodiment, AI, ML, and/or DL is operable to locate actionable opportunities to increase efficiency in a user's routine including, but not limited to, those based on predicted and/or current environmental data and/or location data. In another embodiment, AI, ML, and/or DL is used to recognize patterns in environmental data and/or location data that are not expected for a tagged asset and notify the user account associated with the tagged asset.

In one embodiment, the system utilizes Artificial Intelligence (AI). In one embodiment, the system utilizes deploys Machine Learning (ML). In another embodiment, the system utilizes Deep Learning (DL). In yet another embodiment, the system utilizes AI, ML, DL, and/or combinations thereof.

AI, ML, DL, and/or Big Data enable the system to gather data intelligence, forecast, map, and/or provide market intelligence. In a preferred embodiment, AI, ML, DL, and/or Big Data algorithms are encompassed in the learning engine and/or the analytics engine of the remote server.

In one embodiment, the AI and/or the ML is operable to make recommendations to the user. In another embodiment, the AI and/or the ML is operable to automatically set actions related to the tagged asset to avoid negative events and/or consequences related to the tagged asset. In one embodiment, the AI and/or the ML is operable to use historical data to identify trends in the behaviors of the user, the location data, the environmental data, and/or data related to the tagged asset to make predictions as to future conditions to pre-emptively provide notifications of upcoming events, conditions, and/or threats to related to the tagged asset. In one embodiment, that AI and/or the ML includes one or more natural language processing (NLP) algorithm. Additional details about NLP are disclosed in U.S. patent application Ser. No. 17/317,047, which is incorporated herein by reference in its entirety. The one or more NLP algorithm is operable to analyze audio data (including audio data from video data) and/or text to provide analysis of the meaning of speech and/or language captured in the audio data or written in text. In a preferred embodiment, the at least one NLP algorithm is operable to take feedback from the user as a method of learning as a means to improve its performance.

Workflows and automation are important within the system. The AI and/or the ML is operable to leverage a Bayesian inference engine. The Bayesian inference engine is different from a normal decision tree or a flow process in that every node (tag) connected to the network is operable to infer its state to all other nodes (tags) connected to the network, so every tag knows about every other tag. In one embodiment, only connected tags (e.g., common ownership) or tags with permission to share are operable to share state information. Unlike any other intelligence system, the present invention enables information flow in all directions at all times. This is unlike a left to right logic or branching logic. For example, and not limitation, if the weight of the asset of a first tag is less than 45 kg (99.2 lbs.) and the temperature of the environment of the asset of a second tag is greater than 32° C. (89.6° F.) and it is not raining outside, then open the spigot and water the plants located near the asset of the second tag. The system is operable to make decisions and automate processes for applications including, but not limited to, data collection, data validation, condition monitoring, remote diagnosis, event management, data dashboarding, proactive maintenance, field service optimization, service level agreement (SLA) validation, selling equipment as a service, and/or improving energy efficiency. For workflow, a manufactured or assembled product gets scanned along the process, so the manufactured or assembled product is manufactured or assembled properly before the manufactured or assembled product ships.

Data from a first asset is operable to be affected by data from at least one other asset and/or third-party data. For example, and not limitation, if there are 99 tags registered to a project, the project is not shipped until there are 100 tags registered. In another example, the third-party data includes, but is not limited to, weather data or logistics data (e.g., arrival of a shipping container or truck). Thus, data from a plurality of tags (e.g., thousands, millions) is operable to create unique and previously unavailable intelligence or automation. In yet another example, nursing homes often store oxygen tanks in an area above a temperature requirement (i.e., temperature is too high). Advantageously, if an oxygen tank includes a tag of the present invention, the platform is operable to determine the temperature of the location and provide an alert and/or notification that the temperature is too high. This allows the oxygen tank to be moved to a safer location and/or the room temperature to be lowered.

Data Processing and Actions

Environmental data (e.g., humidity, altitude, speed, barometric pressure, and temperature) and/or location data associated with a tagged asset are processed and monitored by the system. In one embodiment, the environmental data and/or the location data are constantly monitored and stored by the cloud-based platform. In one embodiment, the location data and/or the environmental data are stored in local storage on the remote device and/or in the at least one database. The environmental data and/or the location data are operable to be compared in real time to rules and/or thresholds set in the system for the tagged asset and/or recommendations from the analytics engine. In one embodiment, once location conditions and/or environmental conditions are met, the system is operable to initiate an action in a network-enabled device connected to the system based on the rules and/or the thresholds for the tagged asset and/or the recommendations from the analytics engine. In one embodiment, the network-enabled device is connected to the same network as the at least one tagged asset. In an alternative embodiment, the system is operable to initiate an action in a network-enabled device that is not connected to the same network as the at least one tagged asset.

In one embodiment, conditions required to initiate actions are determined by location data and/or environmental data collected from the tagged asset. In another embodiment, other data (e.g., location data and/or environmental data collected by another tagged asset within a designated proximity of the tagged asset) is used to initiate actions. In one embodiment, conditions required to initiate action are obtained by data collected by the at least one remote device, the at least one tag, the at least one disc, the at least one hub, and/or third-party sources.

For example, and not limitation, the system provides an alert (e.g., an SMS message) when a tagged asset enters and/or leaves a predetermined geographical area. In an alternative non-limiting example, the system provides an alert (e.g., a push notification) whenever rain is forecasted at a location of a tagged asset (e.g., water sensitive outdoor furniture). In a further non-limiting example, the system provides an alert (e.g., an e-mail) whenever a humidity, pressure, or temperature of an environment of a particular tagged asset or the altitude or location of the particular tagged asset is outside a specified range.

The system is also operable to initiate actions that include notifying individuals other than the user when specific conditions are met (e.g., via the environmental data, the location data). In one non-limiting example, a backpack is a tagged asset and the system includes an action that notifies emergency services if the altitude of the tagged asset is over a certain threshold for greater than a specified amount of time or changes very rapidly in a way that might indicate the tagged asset has fallen. Advantageously, the system is operable to monitor both a duration of a planned hike and a status of the tagged item (e.g., altitude) in real time or near-real time. Additionally, the system is operable to include at least one additional condition to the action to ensure emergency services are not unnecessarily notified. One example of a secondary condition includes, but is not limited to, only notifying emergency services if the altitude of the tagged asset has been higher than a threshold for greater than a specified amount of time and a second tagged asset (e.g., canister of oxygen) is not within 15 feet of the tagged asset. By doing so, a call to emergency services is not placed unless needed.

In another non-limiting example, the system includes an action of notifying the police when a tagged asset leaves a certain location to report the tagged asset as stolen. Advantageously, the system allows for a secondary condition to the action (e.g., the tagged asset not being within 5 feet of the remote device). This prevents the police from accidentally being notified in the event that the user forgets to disable the action in the system before leaving the specified area in which the tagged asset is supposed to be located.

Further, the system allows for actions including notifications to at least one additional remote device other than the user device (e.g., remote device) based on certain environmental conditions being met. In a non-limiting example, the system includes an action for an alert (e.g., SMS message) designated by an administrator to be sent to phones belonging to all employees in the event a tagged asset is located in an area where the temperature has been below a certain threshold for a certain amount of time. In this example, the system is also operable to include a secondary condition that the remote device is not located in a certain distance from the tagged asset. In one embodiment, the system is operable to interface with a work schedule and contact information that designates employees as "on call" and only notifying the on-call employees.

Actions set in the system are also operable to include commands sent to network-enabled devices that are connected to the system. In a non-limiting example, the system includes an action for the system to send a command to a network-enabled computer having control over movement of a train. The command is to decrease a speed of the train in the event that the tagged asset is traveling at a speed greater than a threshold speed. An actual speed (e.g., via sensor data) is compared to the threshold speed for the actions assigned to the tagged asset and it is determined that the tagged asset is traveling greater than the threshold speed. The system then sends a command to the network-enabled computer controlling the train to slow the train.

In a separate, non-limiting example, a tagged box of chocolate includes a threshold temperature (e.g., a high temperature). A manufacturer specifies an action of turning on an air conditioning system to cool a storage area of a box truck if the temperature of the storage area exceeds the threshold temperature in an effort to prevent chocolates from melting during transportation without wasting excess energy by keeping the air conditioning running at all times. In another non-limiting example, a network-enabled dehumidifier is activated in the event the humidity of an environment for a tagged asset exceeds a designated threshold.

A person of ordinary skill in the art will understand that these examples are not intended to limit the scope of the present invention and any permutation of conditionals (if-then, if-then-else, etc.), Boolean operators (AND, OR, NOT, or AND NOT), and data available to the system (location data, environmental data, etc.) is operable to be used to set at least one action within the system.

Data Analytics

The present invention further provides data analytics and insightful information regarding the at least one tagged asset. Data related to the at least one tagged asset (e.g., environmental data, location data) collected by the at least one remote device, the at least one tag, the at least one disc, and/or the at least one hub is collected and provided to the analytics engine. The data related to the at least one tagged asset is further analyzed and operable to be presented, for example, via notifications, alerts, and/or reports. Examples include, but are not limited to, historical weather data analysis, historical location data analysis, use analysis, value analysis, etc.

Leveraging data from many tagged assets creates unique intelligence. The system is operable to leverage the Bayesian inference engine as previously described.

Advantageously, in a preferred embodiment, this system is a closed system. Data is only communicated within the platform between authorized components (e.g., tags, sensors, devices) and/or authorized individuals. Thus, only individuals who are expressly given permission to communicate with a tag are operable to communicate with the tag. In one embodiment, authorized individuals are only able to receive data from the tag when communicating with the tag. For example, in one embodiment, a tag only provides location data when scanned (e.g., NFC, RFID) and data is not automatically transmitted to the platform.

Architecture

Figure 8:
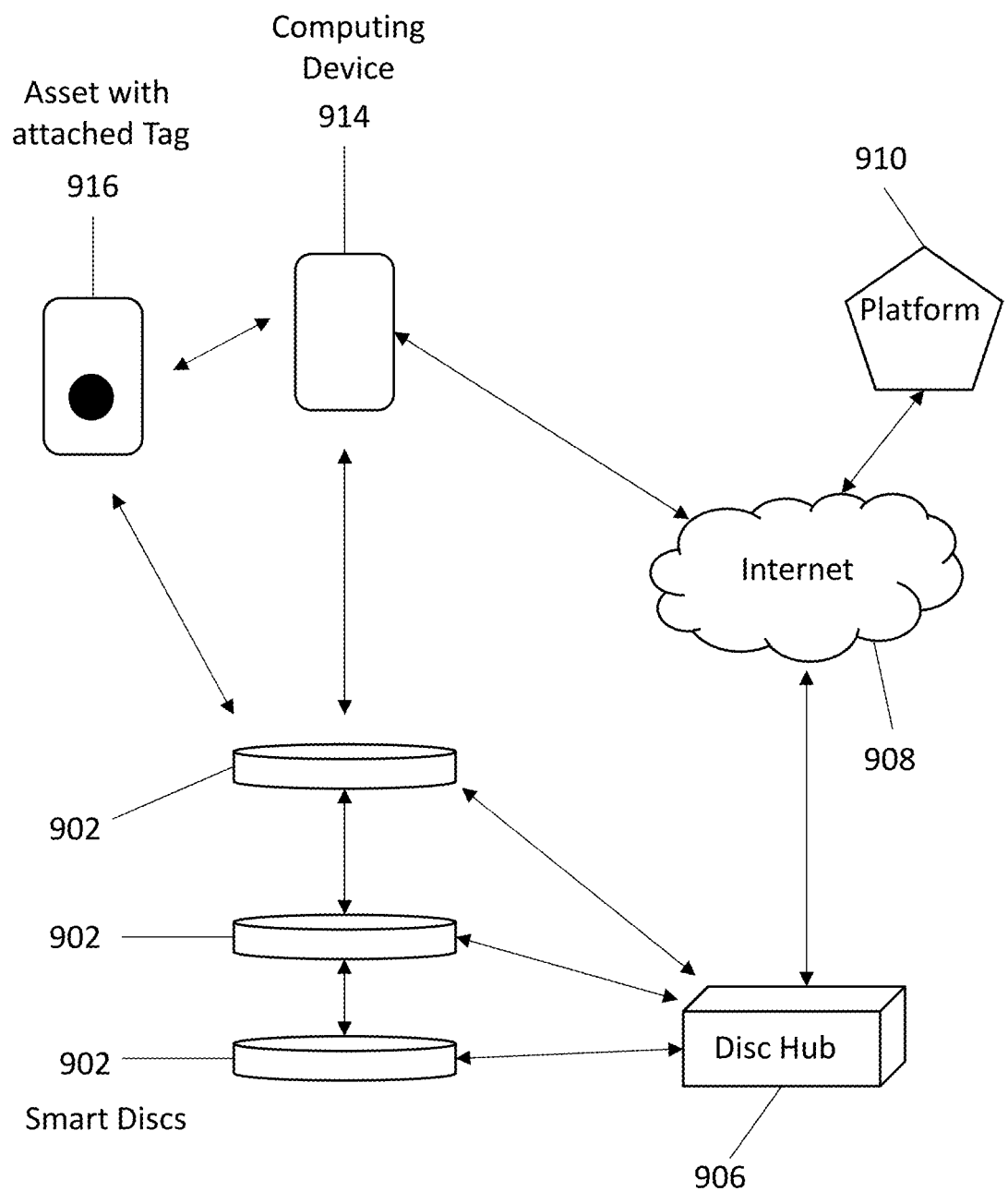
FIG. 8 illustrates one embodiment of a platform architecture of the present invention.

FIG. 8 illustrates one embodiment of a platform architecture of the present invention. At least one computing device 914 is operable to read at least one tag connected to at least one asset 916 and write to the at least one tag connected to at least one asset 916, wherein the at least one tag connected to at least one asset 916 is operable for data storage. The at least one computing device 914 includes, but is not limited to, a device operable to capture audio, video, and/or images of a tagged asset. In addition, the at least one computing device 914 is operable for network communication with at least one smart disc 902 and at least one platform 910. The at least one platform 910 provides the authentication, management, and data analysis of the assets using tags and other capture data. Each of the at least one smart disc 902 is operable to read the at least one tag connected to at least one asset 916 and write data to the at least one tag connected to at least one asset 916, wherein the at least one tag connected to at least one asset 916 is operable for data storage. Each of the at least one smart disc 902 is further operable to weigh, measure, capture images, capture video, and/or record audio of at least one asset. Each of the at least one smart disc 902 is operable for network communication with other smart discs 902 as well as with a mesh network. Each of the at least one smart disc 902 is further operable for network communication with the at least one platform 910 through the computing device 914 and/or through a disc hub 906. Alternatively, each of the at least one smart disc is operable for direct network communication the at least one platform. In one embodiment, the disc hub 906 enables network communication between at least two smart discs 902, wherein the disc hub 906 is in network communication with the Internet 908. Alternatively, each of the at least one smart disc is operable for direct network communication with at least one other smart disc. In one embodiment, the disc hub 906 enables wireless network communication between smart discs 902 including, but not limited to, BLUETOOTH, NFC, and/or WI-FI, wherein the smart discs 902 are further operable for network communication with the at least one platform 910.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

The system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 9:
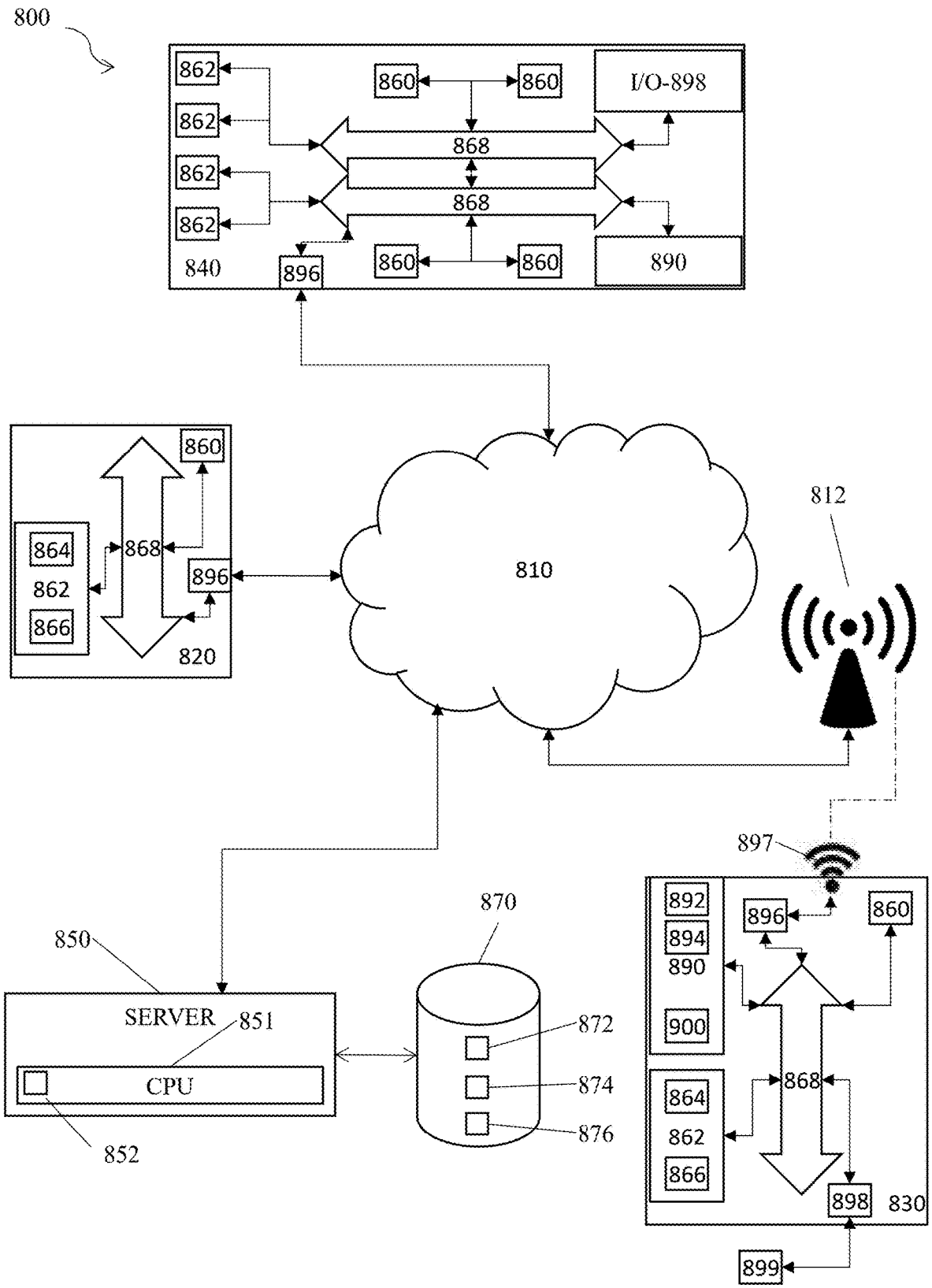
FIG. 9 illustrates a schematic diagram of a system of the present invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 1000. Non-transitory computer readable media includes all computer readable media, with the sole exception being a transitory, propagating signal per se. The instructions 1000 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for asset management comprising:
at least one tag attached to at least one asset;
an asset management platform including a server with a processor and a memory;
wherein the asset management platform includes an alert engine;
wherein the asset management platform is operable to search for the at least one asset based on input from a user;
wherein the at least one tag includes at least one sensor;
wherein the at least one tag is associated with asset data related to the at least one asset;
wherein the asset data is configured to be displayed on a display device upon the display device reading the at least one tag;
wherein the at least one sensor is configured to collect data related to the at least one asset and transmit the data to the asset management platform;
wherein the asset management platform utilizes machine learning and/or artificial intelligence to predict actions of interest to the user based on patterns in the data;
wherein the machine learning and/or artificial intelligence includes a Bayesian inference engine;
wherein the data includes environmental data, location data, image data, video data, and/or audio data;
wherein the alert engine of the asset management platform is configured to send an alert to a device in communication with the platform based on the data and a condition;
wherein the asset management platform is configured to instruct an Internet of Things (IoT) device to take an action upon the data related to the at least one asset meeting or exceeding a predetermined value for the at least one asset; and
wherein the action includes notifying emergency services that the at least one asset is stolen based on the data and the condition.

2. The system of claim 1, wherein the sensor includes a temperature sensor, wherein the alert is created based on a temperature measured by the sensor reaching a threshold or a temperature remaining above or below a threshold temperature for a predetermined time.

3. The system of claim 1, wherein the asset management platform includes a learning engine, wherein the learning engine is configured to analyze historical data from the at least one sensor using the machine learning or the artificial intelligence, and identify trends in the historical data, and wherein the alert engine creates the alert based on the data and the historical data.

4. The system of claim 1, wherein the asset management platform is further configured to send an instruction to an Internet of Things (IoT) device to change a parameter, activate, or deactivate based on the data and the condition.

5. The system of claim 1, wherein the at least one tag associated with the at least one asset includes a multiplicity of tags associated with a multiplicity of assets, wherein each of the multiplicity of tags is configured to send state information including data measured by at least one sensor to the asset management platform, and wherein the Bayesian inference engine is configured to receive the data from a multiplicity of sensors associated with the multiplicity of assets and create analyzed data based on the data received from the multiplicity of sensors, and wherein the asset management platform is configured to instruct an Internet of Things (IoT) device to perform an action based on the analyzed data.

6. The system of claim 1, wherein the data includes the location data, wherein the location data is associated with a location outside of a geofence indicating that the at least one tag is located outside of the geofence, and wherein the alert is based on the at least one tag being located outside of the geofence.

7. The system of claim 1, wherein the at least one asset is not configured to connect to a network or communicate over a network.

8. The system of claim 1, further comprising at least one second tag attached to at least one second asset, wherein the at least one second tag is associated with asset data related to the at least one second asset, and wherein an analysis engine is configured to compare the asset data related to the at least one second asset to the asset data related to the at least one asset.

9. A system for asset management comprising:
at least one tag associated with at least one asset;
an asset management platform including a server with a processor and a memory;
wherein the at least one tag includes at least one sensor;
wherein the at least one tag is associated with asset data related to the at least one asset;
wherein the asset data is configured to be displayed on a display device upon the display device reading the at least one tag;
wherein the at least one sensor is configured to collect data related to the at least one asset and transmit the data to the asset management platform;
wherein the asset management platform is operable to search for the at least one asset based on input from a user;
wherein the asset management platform utilizes machine learning and/or artificial intelligence to predict actions of interest to the user based on patterns in the data;
wherein the machine learning and/or artificial intelligence includes a Bayesian inference engine;
wherein the data includes environmental data, location data, image data, video data, and/or audio data;
wherein the asset management platform is configured to send an instruction to an Internet of Things (IoT) device to change a parameter of the IoT device, activate the IoT device, or deactivate the IoT device based on the data and a condition;
wherein the asset management platform is configured to instruct the IoT device to take an action upon the data related to the at least one asset meeting or exceeding a predetermined value for the at least one asset; and
wherein the action includes notifying emergency services that the at least one asset is stolen based on the data and the condition.

10. The system of claim 9, wherein the data includes the location data, wherein the location data is associated with a location outside of a geofence indicating that the at least one tag is located outside of the geofence, and wherein the alert is based on the at least one tag being located outside of the geofence.

11. The system of claim 9, wherein the data includes the location data and the environmental data, wherein the environmental data includes humidity, temperature, and/or an ultraviolet (UV) index.

12. The system of claim 9, wherein the asset management platform includes a learning engine and an alert engine, wherein the learning engine is configured to analyze historical data from the at least one sensor and identify trends in the historical data, and wherein the alert engine is configured to create an alert based on the data and the historical data.

13. A system for asset management comprising:
at least one first tag attached to at least one first asset;
at least one second tag attached to at least one second asset;
an asset management platform including a server with a processor and a memory;
wherein the asset management platform includes an analysis engine and an alert engine;
wherein the asset management platform is operable to search for the at least one asset based on input from a user;
wherein the asset management platform utilizes machine learning and/or artificial intelligence to predict actions of interest to the user based on patterns in the data;
wherein the machine learning and/or artificial intelligence includes a Bayesian inference engine;
wherein the at least one first tag includes at least one first sensor;
wherein the at least one second tag includes at least one second sensor;
wherein the at least one first tag is associated with asset data related to the at least one first asset;
wherein the at least one second tag is associated with asset data related to the at least one second asset;
wherein the asset data related to the at least one first asset is configured to be displayed on a display device upon the display device reading the at least one first tag;
wherein the asset data related to the at least one second asset is configured to be displayed on a display device upon the display device reading the at least one second tag;
wherein the at least one first sensor is configured to collect data related to the at least one first asset and transmit the data related to the at least one first asset to the asset management platform;
wherein the at least one second sensor is configured to collect data related to the at least one first second and transmit the data related to the at least one second asset to the asset management platform;
wherein the data related to the first asset and the data related to the second asset includes environmental data, location data, image data, video data, and/or audio data; and
wherein the analysis engine is configured to compare the data related to the first asset to a predetermined value for the first asset;
wherein the analysis engine is configured to compare the data related to the second asset to a predetermined value for the second asset;
wherein the alert engine is configured to send an alert or an instruction to a device in communication with the platform upon the data related to the first asset meeting or exceeding the predetermined value for the first asset and the data related to the second asset meeting or exceeding the predetermined value for the second asset;

wherein the asset management platform is configured to instruct an Internet of Things (IoT) device to take an action upon the data related to the first asset meeting or exceeding the predetermined value for the first asset and the data related to the second asset meeting or exceeding the predetermined value for the second asset; and wherein the action includes notifying emergency services that the at least one asset is stolen based on the data and a condition.

14. The system of claim 13, wherein the data related to the first asset and the data related to the second asset include location data.

15. The system of claim 13, wherein the data related to the first asset and the data related to the second asset include different data types.

16. The system of claim 13, wherein the at least one first tag is configured to communicate the asset data related to the at least one first asset to the at least one second tag.

\* \* \* \* \*